(12) United States Patent
Wolff et al.

(10) Patent No.: US 12,514,964 B2
(45) Date of Patent: *__Jan. 6, 2026__

(54) DEVICE FOR MEASURING PRESSURE IN AN EXTRACORPOREAL BLOOD CIRCUIT

(71) Applicant: B. Braun Avitum AG, Melsungen (DE)

(72) Inventors: Henrik Wolff, Adelshausen (DE); Tobias Wuerschmidt, Hann. Muenden (DE)

(73) Assignee: Braun Avitum AG, Melsungen (DE)

( * ) Notice: Subject to any disclaimer, the term of this patent is extended or adjusted under 35 U.S.C. 154(b) by 706 days.

This patent is subject to a terminal disclaimer.

(21) Appl. No.: 17/775,344

(22) PCT Filed: Nov. 12, 2020

(86) PCT No.: PCT/EP2020/081950
§ 371 (c)(1),
(2) Date: May 9, 2022

(87) PCT Pub. No.: WO2021/094474
PCT Pub. Date: May 20, 2021

(65) Prior Publication Data
US 2022/0409788 A1        Dec. 29, 2022

(30) Foreign Application Priority Data
Nov. 13, 2019  (DE) .................. 10 2019 130 656.6

(51) Int. Cl.
*A61M 1/16*          (2006.01)
(52) U.S. Cl.
CPC ..... *A61M 1/1601* (2014.02); *A61M 2205/332* (2013.01); *A61M 2205/3331* (2013.01); *A61M 2205/702* (2013.01)

(58) Field of Classification Search
CPC ........ A61M 1/16; A61M 1/36; A61M 1/1621; A61M 1/1601; A61M 2205/332;
(Continued)

(56) References Cited

U.S. PATENT DOCUMENTS 5,580,460 A     12/1996  Polaschegg
6,857,318 B1 *   2/2005  Silber ...................... G01L 7/02
                                                           73/730

(Continued)

FOREIGN PATENT DOCUMENTS

DE          3838689 C1      6/1990
DE          4239937 A1      6/1994
(Continued)

OTHER PUBLICATIONS

Office Action received Japanese Application No. 2022-527189 dated Aug. 13, 2024, with translation, 6 pages.
(Continued)

*Primary Examiner* — Dirk R Bass
(74) *Attorney, Agent, or Firm* — Christopher A. Rothe; CM Law

(57) ABSTRACT

A method for referencing a pressure or force sensor configured to measure pressure in a tube filled with fluid. The pressure or force sensor is located in an extracorporeal circuit and integrated into or inserted in a clamping device The method includes: (1) referencing a force or pressure reference signal which the pressure or force sensor outputs, with a force or pressure reference signal measured by a force or pressure reference sensor; and (2) using a dialysis fluid side force or pressure reference sensor in a dialysis fluid circuit configured to detect the pressure in the dialysis fluid circuit, for referencing a pressure sensor or force sensor in the extracorporeal circuit. A device uses a dialysis fluid side force or pressure reference sensor in the dialysis fluid circuit
(Continued)

that detects pressure in the dialysis fluid circuit, for referencing at least one pressure or force sensor in the extracorporeal circuit.

5 Claims, 11 Drawing Sheets

(58) Field of Classification Search
CPC .. A61M 2205/3331; A61M 2205/3362; A61M 2205/70; A61M 2205/702; A61M 2209/082; G01L 27/00; G01L 9/00
See application file for complete search history.

(56) References Cited

U.S. PATENT DOCUMENTS

| | | | |
|---|---|---|---|
| 6,889,556 | B2 | 5/2005 | Steger |
| 2005/0120799 | A1 | 6/2005 | Gysling et al. |
| 2007/0000333 | A1 | 1/2007 | Brugger et al. |
| 2013/0158869 | A1* | 6/2013 | Lerenc ............... G01C 21/3438 701/527 |
| 2013/0303963 | A1 | 11/2013 | Breuch et al. |
| 2014/0102983 | A1 | 4/2014 | Meibaum et al. |
| 2015/0306295 | A1 | 10/2015 | Rovatti |
| 2018/0272055 | A1 | 9/2018 | Itamochi et al. |

FOREIGN PATENT DOCUMENTS

| | | |
|---|---|---|
| DE | 19747254 A1 | 5/1999 |
| DE | 19747254 C2 | 1/2000 |
| EP | 1357372 A1 | 10/2003 |
| JP | 2006081852 A | 3/2006 |
| JP | 2018027205 A | 2/2018 |
| JP | WO2018151084 A1 | 2/2020 |
| WO | 2020234407 A1 | 11/2020 |

OTHER PUBLICATIONS

Search Report received in German Application No. 10 2019 130 656.6 dated Jul. 31, 2020, with translation, 12 pages.
Search Report received in International Application No. PCT/EP2020/081950 dated Feb. 17, 2021, with translation, 9 pages.
Written Opinion received in International Application No. PCT/EP2020/081950 dated Feb. 17, 2021, with translation, 13 pages.
Communication pursuant to Article 94(3) EPC received in European Application No. 20 807 330.4 dated Dec. 12, 2024, with translation, 11 pages.
Office Action received in Chinese Application No. 202080079327.6 dated Jan. 2, 2025, with translation, 31 pages.
Search Report received in Chinese Application No. 202080079327.6 dated Dec. 23, 2024, with translation, 8 pages.
Office Action received in European Application No. 20 807 330.4 dated Nov. 5, 2025, with translation, 9 pages.

* cited by examiner

DEVICE FOR MEASURING PRESSURE IN AN EXTRACORPOREAL BLOOD CIRCUIT

CROSS-REFERENCE TO RELATED APPLICATIONS

This application is the United States national stage entry of International Application No. PCT/EP2020/081950, filed Nov. 12, 2020, and claims priority to German Application No. 10 2019 130 656.6, filed Nov. 13, 2019. The contents of International Application No. PCT/EP2020/081950 and German Application No. 10 2019 130 656.6 are incorporated by reference herein in their entireties.

FIELD

The present disclosure relates to a method as well as a device for calibrating a pressure measurement and/or force sensor measured values for determining a tube internal pressure in the extracorporeal circuit for correcting the measured value determined by the pressure measurement with a correction signal when using force sensors, which are applied to a filled tube.

BACKGROUND

In general, it is possible to measure a tube internal pressure with the aid of a pressure measuring line. In this context, the (first) tube, the internal pressure of which is to be measured, is connected to a pressure measuring line (second tube), which in turn transmits the pressure to be measured to a (piezoelectric) pressure sensor/pressure transducer. For this purpose, the pressure measuring line is connected to the (first) tube via a T-piece. At the upper (free) end of the pressure measuring line, the pressure sensor is preferably arranged with a Luer lock connection. An air cushion is located between a liquid column existing in the pressure measuring line and the pressure transducer, which changes (expands or becomes smaller) when the pressure in the (first) tube changes which in turn leads to a corresponding deflection of the pressure transducer.

Such a pressure measuring method and/or measuring system has the disadvantages, among others, that in case, for example, blood in connection with an extracorporeal circuit, or another air oxidizing liquid is flowing through the (first) tube, a liquid-air contact occurs within the pressure measuring line, the manufacturing and assembly costs of the tube increase due to the T-piece, and the cleaning of the pressure measuring line is made more difficult as a result of this measurement setup. In addition, there are the risks of a direct contact of the pressure sensor/pressure transducer with the liquid, and of germs, which enter the machine and/or of a contamination of the machine. Furthermore, the blood tubing system becomes more confusing, there is an expenditure of work in order to screw in the Luer lock connection, and it is possible that the connection(s) wear out.

In order to avoid a blood-air contact, for example, which is in particular disadvantageous in the case of applications such as, for example, a dialysis, so-called "pressure pods" are being used. In this context, the pressure is not transferred directly from the blood to the air cushion, for example, but blood and air are separated from each other by a flexible membrane. Due to a change in pressure within the (first) tube, the membrane is being deflected, and this force effect is transmitted via an air cushion, which is connected to the membrane, to a pressure sensor, which is measuring the internal pressure of the tube. This means that also in this known design, an air cushion is provided as a pressure transmission medium between the membrane and the pressure sensor, although a direct contact between the air cushion and the fluid, which is flowing in the (first) tube, is avoided. In addition, this measurement setup has the disadvantage that it is entailing high material and manufacturing costs.

For this reason, in EP 1 357 372 A1, for example, a clamping device is provided in which a (first) tube is clamped, the internal pressure of which is to be measured. The internal pressure of the tube is measured non-invasively, that means with the aid of a force measurement via the outer wall of the tube, and not, for example, via a T-branch for a connection between the inside of the vessel and a measuring sensor system. The expansion of the tube due to a change in the internal pressure of the tube is transmitted via a force transmission means to a force sensor, which emits a force signal. The change of the force signal is converted proportionally into a pressure change by the aid of a proportionality factor. In the event of a pressure change, only the tube deformation at a gap, which extends longitudinally through a supporting body of the clamping device, is thus evaluated in order to generate the force signal.

However, when measuring the tube internal pressure via the clamping device, the viscoelastic behavior of the tube must be taken into account. This means that when the tube is clamped, a restoring force is being generated in the form of a drift signal, which superimposes the force signal and/or pressure signal to be measured. In the case of a longer measuring time, the restoring force has the effect that the internal pressure in the (first) tube appears to drop even if the conditions are constant. In order to solve this problem, it has been assumed until now that the pressure signal can be corrected by referencing with ambient air. This means that the viscoelastic behavior is examined by filling the tube with air before the tube is actively being used. The restoring signal, which is received as a result, is then being subtracted from the indicated pressure curve (in the tube filled with a liquid, for example, blood) when being actively used. However, a tube, which is filled with a medium/a liquid, behaves differently than when it is in a condition in which it is filled with air. This is the reason why a pressure signal referenced with ambient air is providing no indication of the pressure signal of a filled tube.

In order to be able to correct such a distorted pressure signal, the document DE 197 47 254 C2 provides a method for correcting a pressure signal which is measured via a clamping device as it has been described above. For this purpose, the course of the restoring force is reproduced in the form of a relaxation function which is dependent on the tube and is known (is determined) in advance. The parameters of this function are being determined from the measured force signal. With the aid of this relaxation function, the force signal can be corrected, and the pressure signal can be determined via a linear relationship with the force signal.

SUMMARY

Against this background, it is the task of the present invention to further improve the correction of the force signal and to correct the drift signal, which is caused by the mechanical properties of the (first) tube before and during an active use of the (first) tube (an active use of the tube means, for example, a tube connected to a patient and/or a tube during a therapy) by means of a reference signal. Furthermore, relative pressure changes as well as the absolute internal pressure of the tube shall preferably be determined with a pressure accuracy of ±10 mmHg.

The invention relates first of all to a method for referencing/calibrating at least one pressure sensor or force sensor, which is configured to measure a tube internal pressure in a tube which is filled with a fluid, wherein the at least one pressure sensor or force sensor is located in an extracorporeal circuit, preferably is resting directly against the tube, and is integrated into a clamping device or is inserted therein, comprising the steps of: referencing/calibrating a pressure signal or a force signal, which is emitted by the at least one pressure sensor or force sensor, with a force reference signal or a pressure reference signal, which is measured by a force reference sensor or a pressure reference sensor which is not designed as a clamping device; and using at least one force reference sensor or pressure reference sensor on the dialysis fluid side, which is a force reference sensor or a pressure reference sensor in a dialysis fluid circuit, and which is configured to detect the tube internal pressure in the dialysis fluid circuit, for referencing/calibrating at least one pressure sensor or force sensor, which is arranged in the extracorporeal circuit, in particular for referencing/calibrating a venous pressure sensor or force sensor.

Advantageously, the method further comprises the step of: using a force reference sensor or a pressure reference sensor on a dialysis fluid inlet side, which is arranged on a dialysis fluid inlet tube, or using a force reference sensor or a pressure reference sensor on a dialysis fluid outlet side, which is arranged on a dialysis fluid outlet tube, for referencing/calibrating a venous pressure sensor or force sensor which is arranged on a venous section of the tube downstream of a dialyzer in the extracorporeal circuit.

The method may further comprise the step of: providing a bypass operation in which a dialysis fluid does not flow through a dialyzer but through a bypass line, and a main connection operation in which the dialysis fluid flows through the dialyzer.

It is further advantageous, if the method comprises the steps of: switching from the main connection operation to the bypass operation; waiting for a predetermined period of time, preferably at least 10 seconds, in order to allow a pressure equalization to occur in the dialyzer between a dialysis fluid side and a blood side across a semipermeable filter membrane of the dialyzer.

An advantageous embodiment of the method is characterized in that it comprises the steps of: operating a pump which is delivering the fluid; and referencing the venous pressure sensor or force sensor via the pressure reference sensor or force reference sensor on the dialysis fluid outlet side Another advantageous embodiment of the method is characterized by the fact that it comprises the steps of: stopping a pump which is delivering the fluid; closing a venous tube clamp, which is a tube clamp in a venous section of the tube; and referencing the venous pressure sensor or force sensor via the force reference sensor or pressure reference sensor on the dialysis fluid inlet side and/or the force reference sensor or pressure reference sensor on the dialysis fluid outlet side.

Preferably, the method further comprises the steps of: carrying out a dialyzer specific calibration/referencing in order to take into account the influences of the dialyzer in the referencing/calibration; and/or taking into account a pulsation of pump roller rotors of a fluid conveying pump in the referencing/calibration; and/or taking into account influencing variables, which are causing an offset deviation of pressure curves, in the referencing/calibration.

The invention further relates to a device comprising: an extracorporeal circuit; a dialyzer; a dialysis fluid circuit/a dialysate circuit; at least one pressure sensor or force sensor, which is arranged in the extracorporeal circuit, is integrated into a clamping device and is configured to measure a tube internal pressure in a tube filled with fluid; at least one force reference sensor or pressure reference sensor, which is not designed as a clamping device, for referencing/for calibrating a pressure signal or a force signal, which is emitted by the at least one pressure sensor or force sensor; wherein the device is configured to use for the referencing of at least one pressure sensor or force sensor, which is arranged in the extracorporeal circuit, at least one force reference sensor or pressure reference sensor on the dialysis fluid side, which is a force reference sensor or a pressure reference sensor in the dialysis fluid circuit, and which is configured to detect the tube internal pressure in the dialysis fluid circuit.

Advantageously, an arterial pressure sensor or force sensor and a dialyzer input pressure or force sensor and a venous pressure sensor or force sensor are provided in the extracorporeal circuit as pressure sensors or force sensors integrated into clamping devices.

Preferably, the tube has an arterial section and a venous section, wherein the arterial pressure sensor or force sensor and the dialyzer input pressure or force sensor are arranged in the arterial section and the venous pressure sensor or force sensor is arranged in the venous section.

Furthermore, the device is preferably configured to use for referencing of a venous pressure sensor or force sensor, which is a pressure sensor or a force sensor in a venous section of the tube downstream of the dialyzer, a force reference sensor or a pressure reference sensor on the dialysis fluid inlet side, which is arranged on a dialysis fluid inlet tube, or a force reference or a pressure reference sensor on a dialysis fluid outlet side, which is arranged on a dialysis fluid outlet tube.

Preferably, the force reference sensor or the pressure reference sensor on the dialysis fluid inlet side is provided on the dialysis fluid inlet tube between the dialyzer and a first shut off valve and/or the force reference sensor or the pressure reference sensor on the dialysis fluid outlet side is provided on the dialysis fluid outlet tube between the dialyzer and a second shut off valve.

It is further advantageous, if upstream of the first shut off valve and downstream of the second shut off valve the dialysis fluid inlet tube is connected to the dialysis fluid outlet tube via a bypass line.

An advantageous embodiment is characterized by the fact that a first shut off valve is provided on the dialysis fluid inlet tube downstream of a first branch off point at which a bypass line branches off from the dialysis fluid inlet tube, a second shut off valve is provided on the dialysis fluid outlet tube upstream of a second branch off point, at which the bypass line passes into the dialysis fluid outlet tube, and a third shut off valve is provided on the bypass line, so that the device is configured to allow a dialysis fluid to flow selectively via the dialyzer or the bypass line, wherein the force reference sensor or the pressure reference sensor on the dialysis fluid inlet side is arranged on the dialysis fluid inlet tube downstream of the first shut off valve and upstream of the dialyzer, and/or the force reference sensor or the pressure reference sensor on the dialysis fluid outlet side is arranged on the dialysis fluid outlet tube downstream of the dialyzer and upstream of the second shut off valve.

In an advantageous manner, the device is configured to carry out and/or to apply the method described above for referencing/for calibrating a pressure sensor or a force sensor.

The method according to the invention and the device according to the invention make it possible to dispense with a pressure measuring line provided in a T-piece with a Luer lock connection and/or a pressure sensor at the upper end of the pressure measuring line in the extracorporeal circuit, so that no conventional force reference sensors or pressure reference sensors are required in the extracorporeal circuit. Preferably, for all pressure sensors or force sensors, which are provided in the extracorporeal circuit (arterial pressure or force sensor, dialyzer input pressure or force sensor, venous pressure or force sensor), so-called clamp on sensors, hence pressure sensors or force sensors, which are bearing against the tube, and are integrated and/or inserted into a clamping device, are to be used. The essence of the present invention is that a force reference sensor or a pressure reference sensor in the dialysis fluid circuit is used for the referencing/the calibrating (adjustment/height correction of the blood fluid pressure and the dialysis fluid pressure) of a pressure measurement value of a clamp on sensor in the extracorporeal circuit. In this regard, the invention takes advantage of the fact that a pressure of the dialysis fluid side equalizes to a pressure of the blood side via the semipermeable filter membrane of the dialyzer. Thus, a reference value for the pressure measurement in the extracorporeal circuit can be measured on the dialysis fluid side.

In this context, the following advantages are achieved with the method according to the invention and the device according to the invention: the manufacturing and assembly costs of the blood tubing system are reduced to a great extent, and the usability is improved. The time/work expenditure required to set up the blood treatment device is reduced, there is less likelihood that leaks may occur, and the clarity of the blood tubing system is improved. A blood to air contact and the associated clotting is reduced and/or is eliminated entirely, so that anticoagulants can be saved which results in reduced treatment costs. In addition to that, connections can no longer wear out because they no longer exist, an ingress of germs and a contamination of the machine associated with it can be prevented, and the cleaning becomes easier.

BRIEF DESCRIPTION OF THE DRAWING FIGURES

In the following, two embodiments of the present disclosure are described in detail with reference to the accompanying drawings.

DETAILED DESCRIPTION

Embodiments of the present disclosure are being described below on the basis of the accompanying figures. It is to be noted that the values shown are only exemplary and are not limiting.

First Embodiment

The first embodiment, which is described below, forms the basis of the present invention and/or represents the basis on which the present invention has been developed. It relates essentially to a method for indirect blood pressure measurement by means of clamping devices (force—pressure clamps). In particular, a method is described below in which the viscoelastic properties of a tube material are taken into account in the force/pressure measurement.

Overall Procedure

Figure 1:
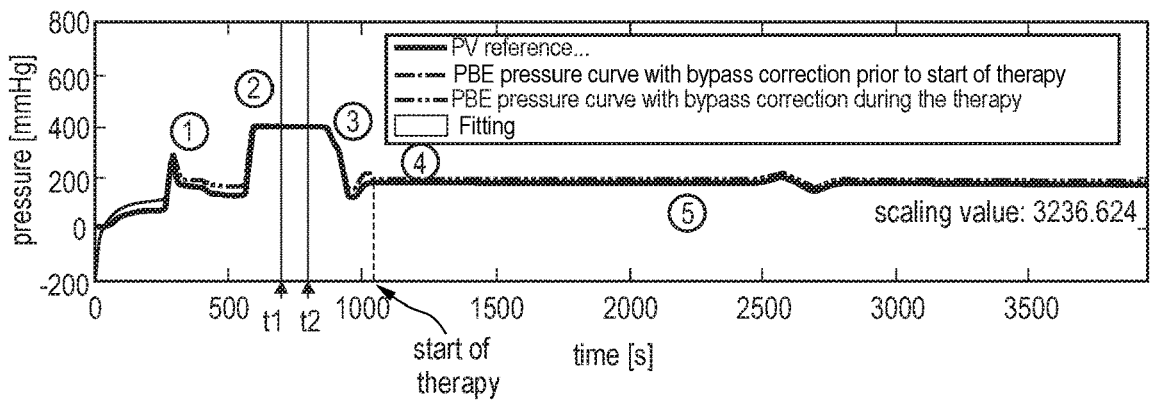
FIG. 1 shows a diagram, which is showing by way of an example the pressure curve in a clamping device over time.

FIG. 1 shows by way of an example the pressure curve in millimeters of mercury (mmHg) of a pressure sensor (in this case the PBE pressure sensor, which is explained in more detail below) with the time t in seconds (s).

In phase 1, a tube is inserted in two clamping devices, into each of which at least one pressure sensor is integrated, and which are measuring a pressure in the form of a force signal, on a dialysis machine, and the tube is filled with a fluid. The tubing system is filled by varying the flow pump speeds of at least one pump. In this phase, leak tests are also carried out on the machine and on the tube.

In phase 2, the pressure in the tube is kept constant. After a short transient phase, a step a) of a recursive analysis and a prediction of at least one correction function for finding a correction signal for correcting the drift signal is carried out by means of a corresponding force reference signal or a pressure reference signal, which is being measured by a first force reference sensor or pressure reference sensor at a constant internal pressure of the tube and a constant internal temperature of the tube. In step a), a correction function f is being determined as a function of time t with two constants $a_0$, b for the viscoelastic behavior of the tube before a therapy. The two constants $a_0$ and b are determined by means of a mathematical procedure referred to in the following as "fitting". This procedure is being explained below. With the aid of this function, a drift signal in the form of a force signal of the respective pressure sensor is determined.

In phase 3, a pressure drop can be detected, which is used to correct the force signal by means of the correction function which has been determined in step a). Furthermore, the corrected force signal of the pressure sensor is converted into a corrected pressure signal by means of the pressure reference signal of a pressure reference sensor provided for this purpose via a linear relationship between the reference signal and the corrected force signal. In this context, the pressure reference sensor is a conventional pressure sensor. Phase 3 is thus showing the sequence of a step b) of a first calibration of the pressure signal or force signal, which is being measured by the first pressure sensor or force sensor, and corrected with the aid of the correction signal, with the force reference signal or pressure reference signal, which is measured by the first force reference sensor or pressure reference sensor, wherein the step b) takes place before the start of the therapy. Thus, in step b), the corrected force signal is being calibrated with the pressure reference signal of the corresponding pressure reference sensor before the therapy. The calibration can also be performed via a second constant pressure level.

A conventional pressure sensor is meant to be a pressure sensor, which is not integrated into any clamping device, and in which no restoring force influences the pressure signal. In the case of a conventional pressure sensor, an internal pressure of the tube is being determined, for example, via a T-piece or a pressure pod or similar (as it has been explained above).

In phase 4, after a predetermined time after the start of the therapy, preferably after 5 minutes, the newly corrected force signal is calibrated again with the pressure reference signal of the corresponding pressure reference sensor. In phase 4, a step c) of a second calibration of the pressure signal or force signal, measured by the first pressure sensor or force sensor and corrected with the aid of the correction function, is thus carried out with the force reference signal or the pressure reference signal which is measured by a second force reference or pressure reference sensor.

In phase 5 the course of the therapy is being illustrated during which the PBE pressure is largely constant. It can be seen that the corrected PBE pressure signal and the reference signal are superimposed on each other, which means that the correction of the pressure signal is sufficient and is working also with varying pressure (see the time interval between approx. 2600 to 2700 s).

In the following, the clamping device, which serves as a pressure sensor, the set up of a machine for which the method according to the invention is used, as well as the steps a) to c) are described in detail and by way of an example. In addition, alternative variations of the disclosure will follow.

Background

Figure 2A:
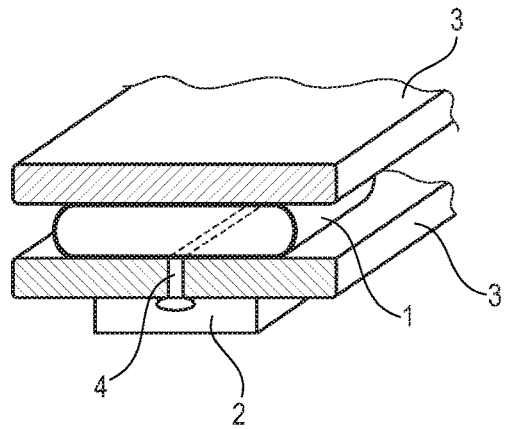
FIG. 2A shows a clamping device into which a tube is clamped.

FIG. 2A shows a (first) tube 1, the internal pressure of which can be measured by a force sensor 2. For this purpose, the tube 1 is clamped in a clamping device 3. Said clamping device is clamping the tube 1, and an expansion or a contraction of the tube 1 is transmitted to the force sensor 2 via a force transmission means 4. The change in force, which can be measured by the force sensor 2, is proportional to the change in internal pressure in the tube 1.

Figure 2B:
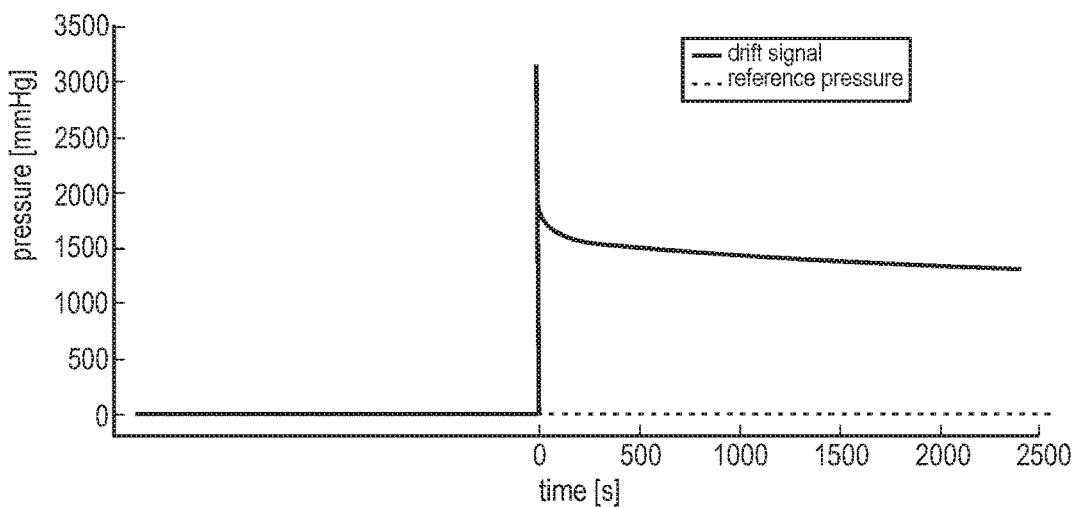
FIG. 2B shows a diagram, which shows the course of a drift signal compared with a reference signal.

FIG. 2B is showing a graph which is displaying the pressure curve of a drift signal and the pressure curve of a reference signal over time. The depicted pressure signal/drift signal is showing the course of a pressure in the tube 1 which is being clamped into the clamping device 3 at the time t0. The reference pressure has a value of 0 mmHg (ambient pressure) over the entire course of time shown. The pressure signal shows a pressure increase at the time t0 and in the following a logarithmically decreasing pressure curve which can be explained by the restoring force of the tube. Said drift signal must be subtracted from the actual measurement signal in order that the absolute pressure is equal to the reference pressure.

Set Up for Carrying Out the Method in Accordance with the Disclosure.

Figure 3A:
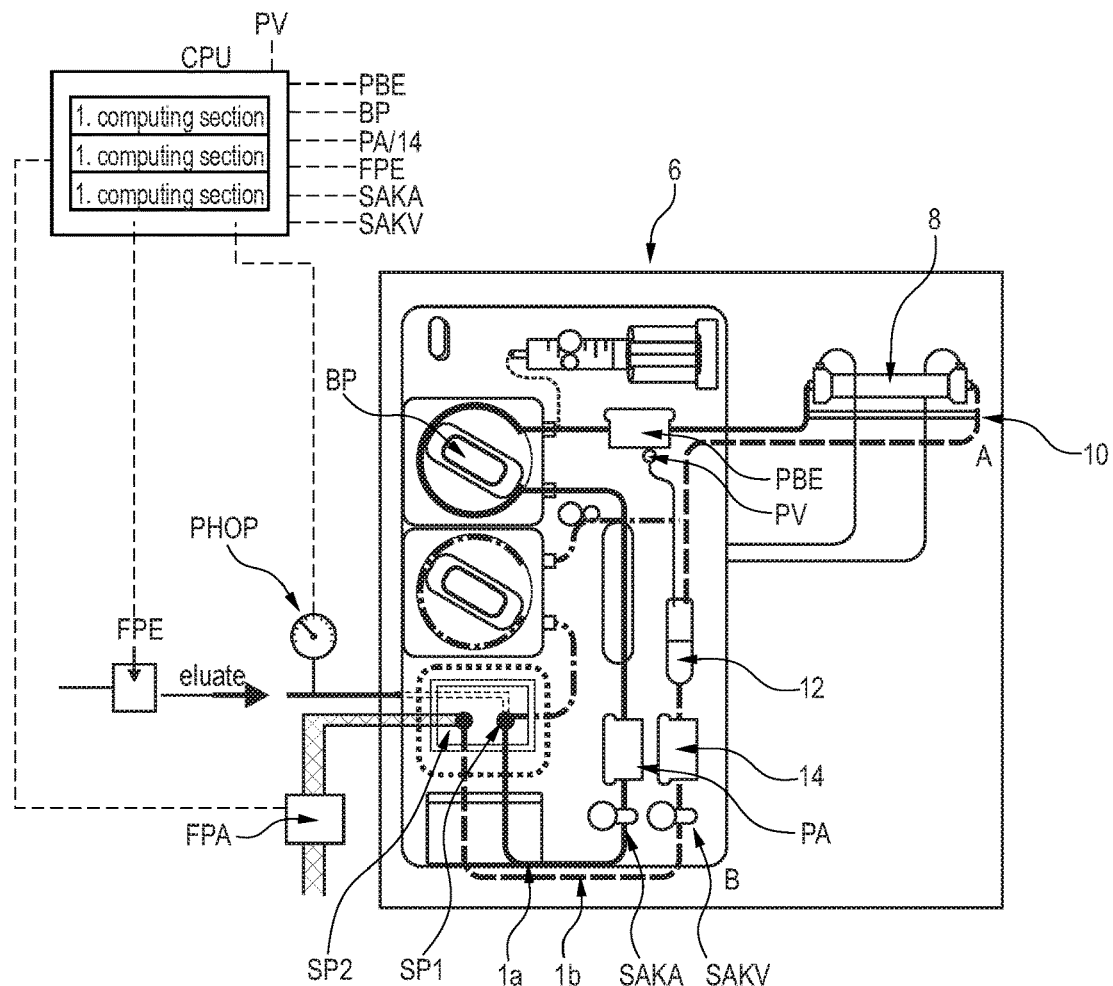
FIG. 3A shows the front a dialysis machine in a state prior to an active use of the tube.

FIG. 3A shows the front of a dialysis machine 6, to which a (first) tube 1 is attached, the internal pressure of which is to be measured at various points. The dialysis machine 6 has an extracorporeal circuit. The tube 1 has an arterial section/branch 1a and a venous section 1b. Via a first substituate port SP1, the arterial section 1a of the tube 1 is being connected to the machine 6, and via a second substituate port SP2, the venous section 1b of the tube 1 is being connected to the machine 6. In the illustrated embodiment, the tube 1 is not connected to a patient, this means that the tube is not in an active use, and therefore in a state prior to a therapy. This is the reason why the tube 1 is not filled with blood in this case but with another fluid which is an eluate here.

The fluid is first delivered into the arterial tube section 1a via a dialysate input flow pump FPE which is arranged outside the front of the dialysis machine 6. Even before the fluid is in the area of the front of the dialysis machine 6, a first pressure reference sensor PHOP records the internal pressure of the tube and/or measures the internal pressure of the tube. Thus, the pressure reference sensor PHOP is also located at the substituate port SP and is an additional pressure sensor compared with conventional dialysis machines 6. After the fluid has entered the front of the dialysis machine 6, it first passes the arterial tube clamp SAKA which is usually open. Subsequently, the fluid passes the first clamping device, which is also referred to as the PA pressure sensor and/or the first pressure sensor PA, and thus the first force sensor. The first clamping device is integrated into the front side of the dialysis machine 6. The PA sensor is measuring the pressure in the arterial section 1*a* of the tube 1. The pressure reference sensor PHOP can be used for referencing the first pressure sensor PA (which is carried out later), since it has a higher measuring accuracy than the first pressure sensor PA.

Subsequently, the fluid reaches the first pump, a blood pump, BP, which continues to pump the fluid. Finally, the fluid passes a second clamping device, which is also referred to as a PBE pressure sensor and/or second pressure sensor PBE, and thus the second force sensor. The PBE pressure sensor is measuring the dialyzer input pressure at a point downstream of the blood pump BP in the direction of flow of the medium in the tube. After the PBE pressure sensor, the fluid can pass through a dialyzer 8. But in the case of a bypass circuit via the bypass 10, it is also possible that the fluid does not flow through the dialyzer but is bypassing the same. Downstream of the dialyzer/bypass in the direction of the fluid flow the venous tube section 1*b* (which is shown here as a dashed line) is located. At a point downstream of the dialyzer/bypass and upstream of an air trap 12, in which air trapped in the fluid is removed from the fluid, the fluid in the venous tube section 1*b* passes a conventional pressure pickup which is referred to as a PV measuring point. The conventional pressure pickup may be designed, for example, as a T piece or as a pressure pod.

After the PV measuring point, the fluid passes through the deaerator 12, then an air detector 14 and finally a venous tube clamp SAKV which is normally open. The venous and the arterial tube clamps SAKV, SAKA are only closed in the event of a fault, and they are blocking the patient access in the case of a therapy. Such an error may be, for example, that the air detector is detecting an amount of air which is greater than a specific threshold value. After the fluid has passed through the venous tube clamp SAKV, it is flowing out through the substituate port SP2 with the aid of a pump capacity of a dialysate output flow pump FPA which is located outside the front of the dialysis machine 6.

Furthermore, FIG. 3A shows that the dialysis machine 6 is connected to a CPU which comprises a first computing section, a second computing section, and a third computing section. In the process, the CPU can control the dialysate input flow pump FPE, the dialysate output flow pump FPA, the pressure reference sensor PHOP, the pressure reference sensor PV, the first pressure sensor PA, the second pressure sensor PBE, the blood pump BP, the arterial tube clamp SAKA, and the venous tube clamp SAKV.

Figure 3B:
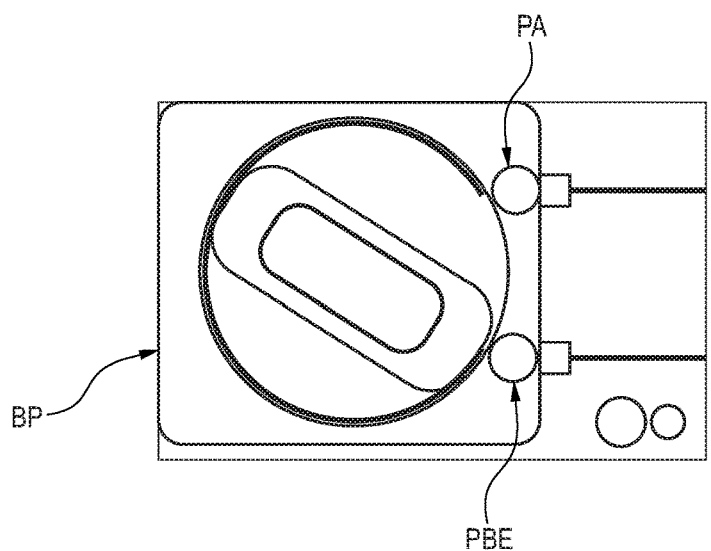
FIG. 3B shows an alternative arrangement of two sensors.

FIG. 3B shows the blood pump BP and an alternative arrangement of the first and the second pressure sensors PA and PBE. In this case, the first (arterial) pressure sensor PA is located directly at the blood inlet of the blood pump BP and the second (dialyzer inlet) pressure sensor PBE is located directly at the blood outlet of the blood pump BP. In this case, both pressure sensors PA and PBE are integrated into the blood pump BP, and the tube material, the temperature and the point in time of insertion of the tube for both pressure sensors PA, PBE are identical. The drift behavior, which can be expected, is identical as well for both pressure sensors PA, PBE. Thus, the differential pressure $P_{PBE}$-$P_A$ of both pressure sensors can be determined without correction of the drift, that means without calibration. The differential pressure $P_{PBE}$-$P_A$ should correspond to the difference of the corrected pressures $P_{PBE\_korr}$-$P_{A\_korr}$ during the entire therapy. By comparison of the two differential pressures (uncorrected with corrected difference), the correctness of the correction function, which is being described later, can be assessed. In the case of a difference of the differential pressures from each other by more than a predetermined amount, a recalibration of the system is advisable.

Step a)

Figure 4:
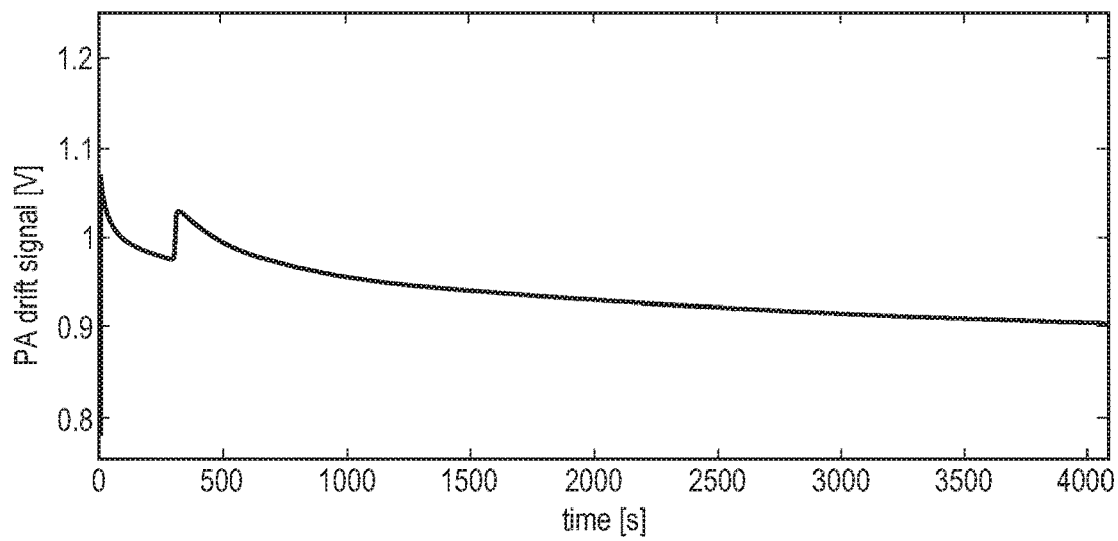
FIG. 4 shows a diagram, which shows the drift behavior of a tube in a closed clamping device.

Similar to FIG. 2B, the FIG. 4 shows the signal course of the clamped tube after the closing of the clamping device. But the force signal of the first pressure sensor PA is shown here as an example in the form of voltage values in the unit volt (V) over time t in seconds (s). At the time t0 (t0=0s), the clamping device is closed. The signal course, which is already known from the FIG. 2B, is shown for a period of time before and during the therapy. The decrease in the signal course can be explained by the viscoelastic properties of the tube material which is influencing the pressure transmission between the force sensor and the fluid in the tube. The elastic portion of the tube generates a restoring force. The viscous portion of the tube causes a slow, irreversible deformation of the tube. Due to this tube deformation, the restoring force is being decreased, and thus also the force with which the tube presses on the force sensor. The curve of the restoring force, which is shown in FIG. 4, is also referred to as the drift signal. In order to be able to represent the force signal and/or the pressure signal of the force sensor as a signal, which depends only on the internal pressure of the tube, it is advisable to determine the drift signal so that it can then be calculated/eliminated from the measured force signal and/or pressure signal, that means subtract the drift signal from the measured force signal.

The viscoelastic behavior of the tube can generally be described by means of an exponentially decaying factor. By this, the drift signal can be described as a mathematical correction function which has the following equation/formula (1):

$$f(t) = a_0 \cdot t^{-b} \quad (1)$$

In this context, t is the time and $a_0$ and b are unknown constants. f(t) has the unit V, since the force signal is emitted as a voltage value.

For further use of the equation, it is advisable to determine the constants $a_0$ and b by fitting. For this purpose, it is necessary to generate a constant internal pressure of the tube by adjusting the pumping ratio of the pumps BP and FPE or FPA. Furthermore, a constant internal temperature of the tube is required. The eluate, which is flowing through the tube, is preheated to 36° C. which is approximately the temperature of the blood during the treatment. Said temperature is kept constant so that the internal temperature of the tube is also constant. Furthermore, the force signal of a pressure sensor, in this case the first pressure sensor PA, is determined in a measurement. But the force signal of another pressure sensor such as, for example, the second pressure sensor PBE, can also be used. The course of the force signal of the first pressure sensor PA over time can be seen in FIG. 5.

Figure 5:
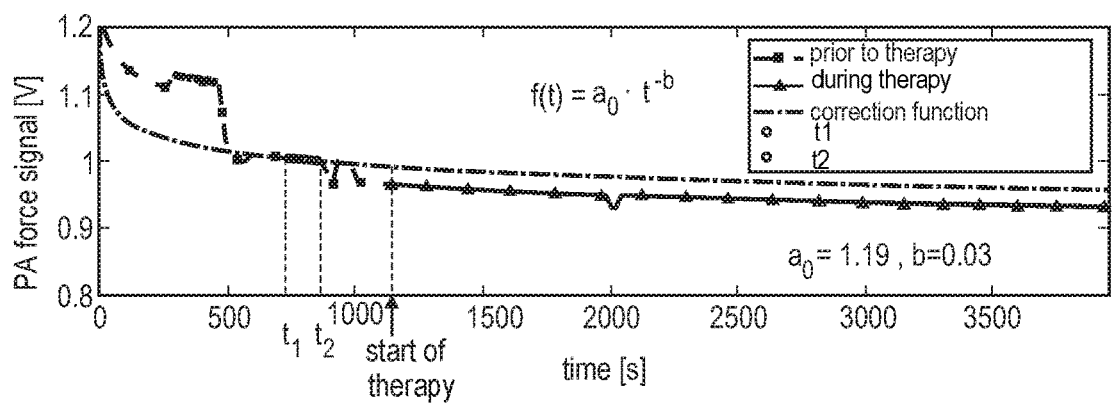
FIG. 5 shows a diagram, which shows the course of the drift signal at a constant tube internal pressure, and the correction function, which maps the drift behavior of the tube.

In the FIG. 5, the force signal is shown as a voltage with the unit volt [V] as a function of time t in seconds [s]. In the time range from 0 s up to approx. 1200 s, during the so-called "priming", a condition prior to an active use of the tube exists, this means prior to a therapy. Prior to the therapy, no patient is connected to the dialysis machine 6, and in this case the dialysis machine 6 is realized as it has been described and shown in connection with the FIG. 3A. In the time range starting at about 1200 s, the voltage signal during the therapy is shown, also referred to as "therapy". During the therapy, a patient is connected to the dialysis machine 6 which is then realized as it has been described and shown in connection with the FIG. 7.

In order to be able to determine the constants $a_0$ and b with the aid of said force signal, the respective signal values of the force signal f(t=t1) and f(t=t2) are being determined in the fitting at two specific points in time t1 and t2 in the area prior to the therapy. In the example, which is shown in the FIG. 5, the points in time t1=600 s and t2=800 s have been selected. The following system of equations results as formulas (2) and (3), which must be solved, in order to obtain the constants $a_0$ and b:

$$I\ f(t=t1)=a_0 \cdot t1^{-b} \qquad (2)$$

$$II\ f(t=t2)=a_0 \cdot t2^{-b} \qquad (3)$$

From equation I, that means the formula (2), $a_0$ can be represented as follows $$a_0=f(t=t1) \cdot t1^{b} \qquad (4)$$

By inserting $a_0$ in the form as shown in formula (4) into formula (3), b results in the form as shown in formula (5), in which it now depends only on the known points in time t1, t2 and the corresponding signal values of the force signal f(t=t1) and f(t=t2), and can thus be calculated:

$$b=\ln(f(t=t2))-\ln(f(t=t1))/(\ln(t1)-\ln(t2)) \qquad (5)$$

After the determination of the value of b, this value can be inserted into formula (4), so that the value of the constant $a_0$ is obtained, and the equation (1) represents the viscoelastic behavior of the tube used. With the points in time t1 and t2 selected above and the voltage values, which are applicable in this test, a value for $a_0$ of 1.19, and a value for b of 0.03 results.

Step a) is carried out here as an example for the PA pressure sensor and is carried out in an analog manner for the PBE pressure sensor.

Step b)

Next, the measured force signal is to be corrected, and converted into a pressure signal by means of the appropriate pressure reference signal. This is done in a phase prior to the therapy and when the internal pressure of the tube changes, for example, when it drops, or via a second constant pressure level with a different pressure compared with the first pressure level. The internal pressure of the tube drops, for example, in the case of a separation of the tube(s) from the substituate port(s) SP1, SP2 which is necessary for the preparation of the therapy. Alternatively, a second pressure level can be adjusted via a different pumping ratio of blood pump and flow pump. Step b) is carried out by way of an example for the first pressure sensor PA.

At first, the drift signal f(t) with the calculated values for $a_0$ and b is subtracted from the force signal $P_{S\_gem}$ measured with the first pressure sensor PA, which force signal is being emitted as a voltage value (in V). Thus, the corrected force signal $P_{S\_Korr}$ has the following equation (formula (6)):

$$P_{S\_Korr}=P_{S\_gem}-f(t) \qquad (6)$$

Figure 6:
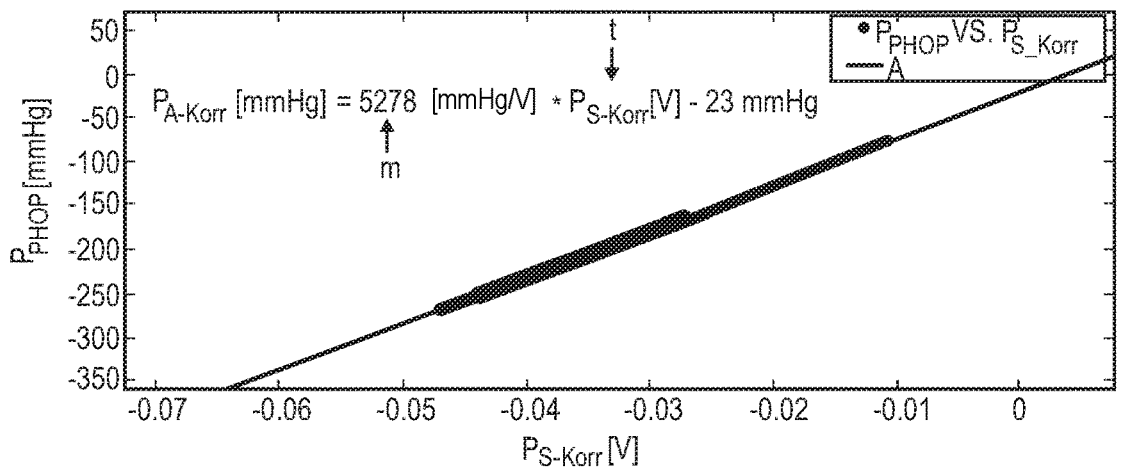
FIG. 6 shows a diagram, which shows the determination of the pressure signal from the drift signal/force signal in a graphical manner.

Then, the first pressure reference sensor PHOP is used to record pressure reference values $P_{PHOP}$ in the unit mmHg and these values are plotted in a diagram above the associated voltage value $P_{S\_Korr}$ in V which is shown by way of an example in FIG. 6.

In the diagram in FIG. 6, the measured pressure reference values $P_{PHOP}$ are plotted on the Y axis as points above the calculated voltage values $P_{S\_Korr}$ on the X axis, and a linear course is shown for these points. Matching to this, a straight line A is determined mathematically, which most suitably is running through these points, and thus represents the relationship between the voltage values $P_{S\_korr}$ and the pressure correction values $P_{A\_Korr}$ calculated from them. This relationship can be stated mathematically as follows in the form of formula (7):

$$P_{A\_Korr}=m \cdot P_{S\_korr}+t \qquad (7)$$

Here, m is the slope of the straight line, which is also called the scaling value, and t is the pressure reference value at which the straight line intersects the Y axis, and which is also called the offset value. In the example shown, a value of 5278 mmHg/V results for the scaling value, and a value of 23 mmHg results for the offset value.

As a result, the corrected and thus correct pressure signal $P_{A\_korr}$ of the first clamping device, that means, of the first pressure sensor PA, is known prior to the therapy, and step b) is completed.

Step b) is carried out for the PBE pressure sensor in an analog manner to the procedure, which is shown here for the PA pressure sensor, but here it is not the PHOP pressure reference sensor, which is being used as a reference, but the PV pressure reference sensor is being used as a reference.

Since, for example, the values of the internal pressure of the tube and/or the internal temperatures of the tube can change from a state prior to the therapy to a state during the therapy, it is recommended that the correction for the measured force signal of the first and/or second pressure sensor be carried out repeatedly during the therapy.

Step c)

Figure 7:
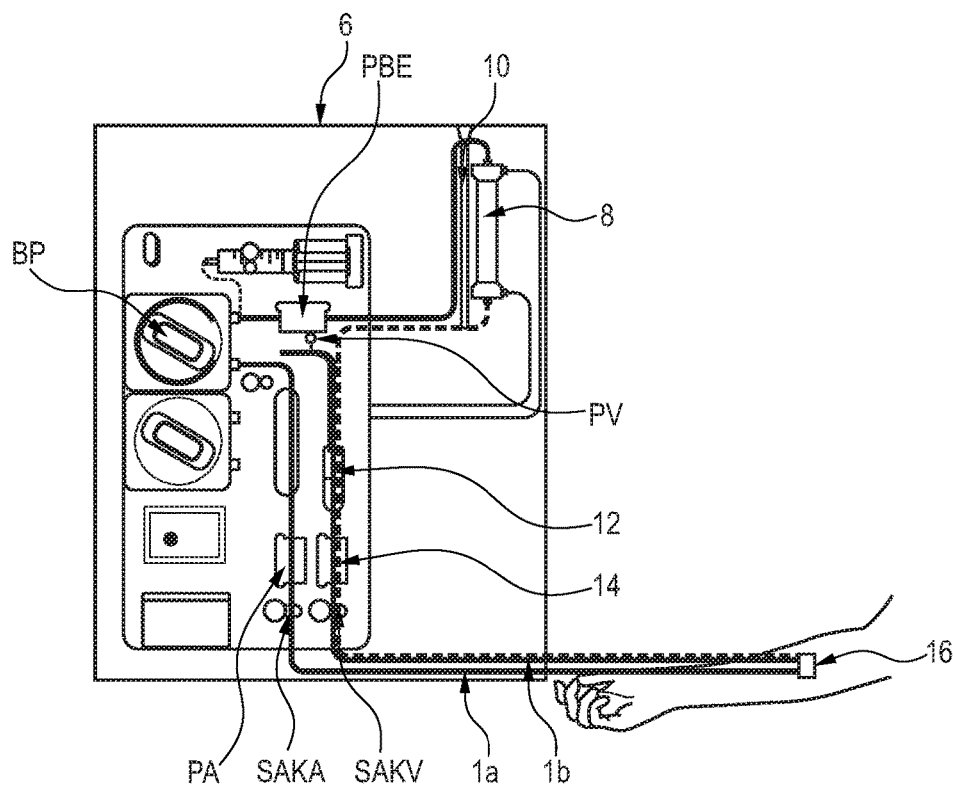
FIG. 7 shows the front of a dialysis machine during an active use of the tube with a patient who is connected to the machine.

During the therapy, the set up, which is being shown in FIG. 2A, changes as it is being shown in the FIG. 7. In the FIG. 7, it can be seen that the arterial and venous tube sections 1a and 1b are connected to the patient. In this case, the heart of the patient replaces the dialysate inflow and dialysate outflow pumps. An (arm) artery, which is connected to the arterial tube section 1a, and an (arm) vein of the patient, which is connected to the venous tube section 1b, are connected to each other via an artificial connection 16, in particular via a patient shunt. As a result, the same blood pressure and the same blood flow values are present in the vein and in the artery (can also be referred to as blood vessels in general terms) of the patient. By setting a bypass on the dialyzer, the same blood pressures and the same blood flow values are also present in the arterial and venous tube sections 1a, 1b and thus in the entire system consisting of tube and patient blood vessels. For experiments, it is conceivable to simulate an experimental patient circuit which has a water pump, a heated water bath and a back pressure valve.

The principle for calibrating and referencing is the same for step c) as for step b). Again, the measured force signal of the pressure sensor is corrected by the correction signal which has been found in step a) and from the relationship between the corrected pressure signal and the corrected force signal known from step b) (cf. formula (6) with the scaling value and offset value determined in step b)), the corrected pressure signal can be calculated.

Step c) can be performed for the first and the second pressure sensors PA, PBE. But here the conventional PV pressure reference sensor serves as the pressure reference sensor not only for the PBE pressure sensor but also for the PA pressure sensor in order to allow a simultaneous referencing of the PA pressure signal and the PBE pressure signal.

In order to simplify matters, it is possible to reference the pressure signal of the second pressure sensor PBE alone with the aid of the pressure reference sensor PV by switching the dialyzer flow to the bypass. Due to the manufacturing dependent identical properties of the tube at the position of the PA clamping device and at the position of the PBE clamping device, it is thus possible to apply the correction function found for the PBE pressure signal to the PA pressure signal as well, although it should be noted, however, that this method is not as accurate as the previously described method, in which one correction function each is determined for the PA pressure signal and for the PBE pressure signal.

Result of the Method According to the Invention

After filtering and scaling the corrected pressure signal, said signal can be compared with the corresponding, directly measured pressure reference signal. This comparison is shown in FIG. 8 by way of an example for the corrected pressure signal $P_{A\_korr}$ and the corresponding pressure reference signal $P_{PHOP}$.

Figure 8:
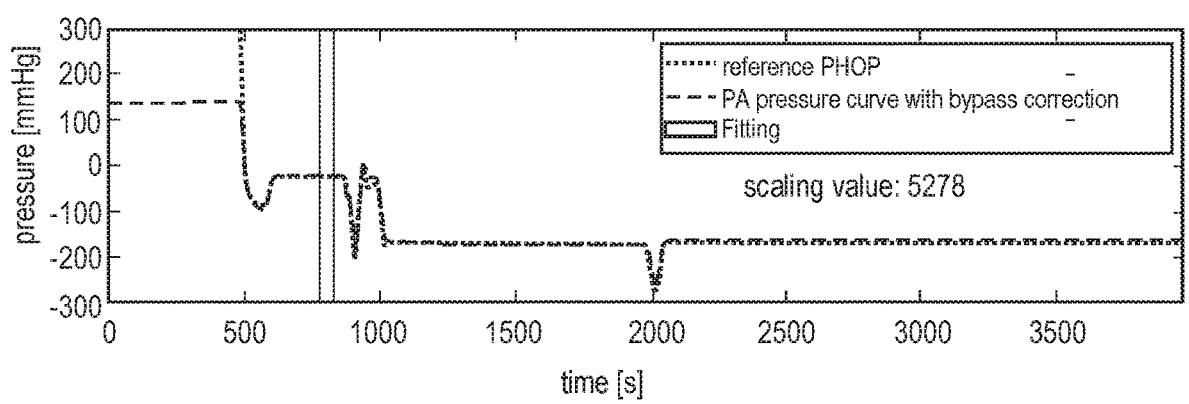
FIG. 8 shows a diagram which shows by way of an example the pressure curve on a first pressure sensor over time when the process is being carried out.

In the diagram in FIG. 8, it can be seen that the course of the calculated pressure correction signal $P_{A\_Korr}$ and the course of the directly measured pressure reference signal $P_{PHOP}$ are congruent. This means that the mathematical correction function from (1) together with the calculated values for $a_0$ and b can eliminate the drift course, but this only works, if the internal pressure of the tube and the internal temperature of the tube are constant. If, for example, the internal pressure of the tube varies when the second voltage value f(t2) is taken, the correction function is not suitable for the description of the course of the drift signal.

Referenceability

Figure 9:
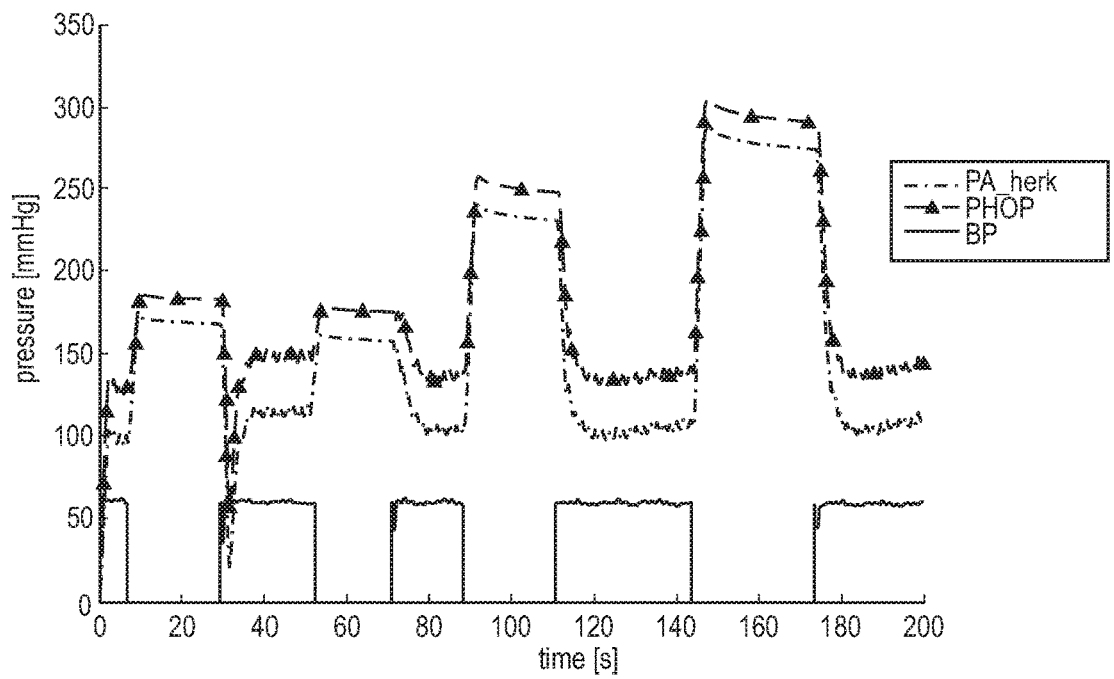
FIG. 9 shows a diagram which shows the pressure curves of a conventional pressure sensor, of a first pressure reference sensor, and of a first pump.
Figure 10A:
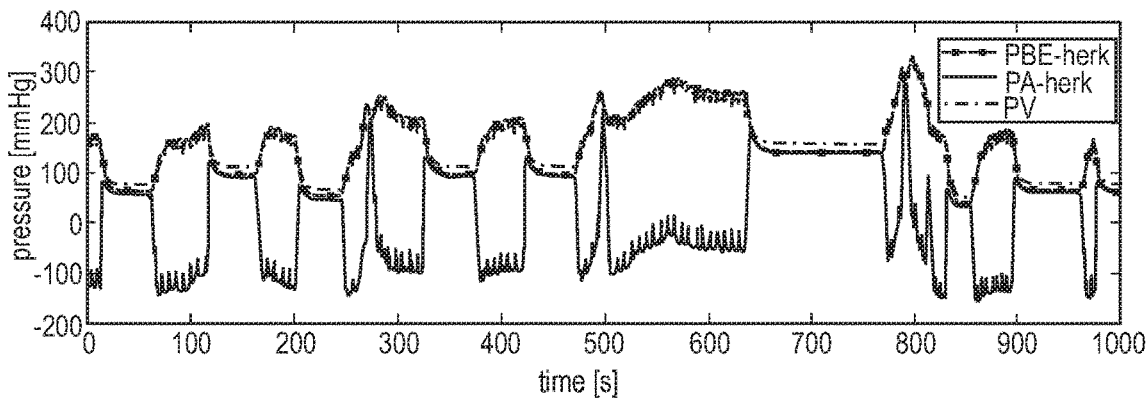
FIG. 10A shows a diagram, which shows the pressure curves of two conventional pressure sensors, and a second pressure reference sensor.

In the following, the FIG. 9 and the FIG. 10A show the pressure curves of the conventionally used pressure sensors for measuring the arterial pressure $P_A$ and the dialyzer input pressure $P_{PBE}$ in comparison with the pressure curve of the corresponding pressure reference sensors PHOP and PV, respectively.

In the FIG. 9, the pressure curve of a conventional first pressure sensor PA_herk for measuring the arterial pressure is compared with the pressure curve of the first pressure reference sensor PHOP prior to the therapy. The pressure curves in mmHg are shown over time t in s. Furthermore, the pressure curve of the blood pump BP is shown which repeatedly has a pressure of 0. The blood pump BP is repeatedly stopped in order to generate constant pressure values of the PA_herk sensor and the PHOP sensor.

It can be seen that the courses of the two pressure signals of the PA_herk pressure sensor and the PHOP pressure reference sensor are similar, and are running in parallel to each other, here with a parallel shift of the curves/a pressure difference of approx. 20 mmHg. The difference between the two pressure signal courses is due to the height differences of the first pressure sensor PA_herk and the first pressure reference sensor PHOP. In the present embodiment, the first pressure reference sensor PHOP is mounted in a higher position than the first pressure sensor PA (see in the FIG. 2A).

Although the pressure difference between the conventional pressure sensor and the pressure reference sensor must be taken into account, the comparison in the FIG. 9 shows that the pressure reference sensor is suitable as a reference sensor for the arterial pressure.

Figure 10B:
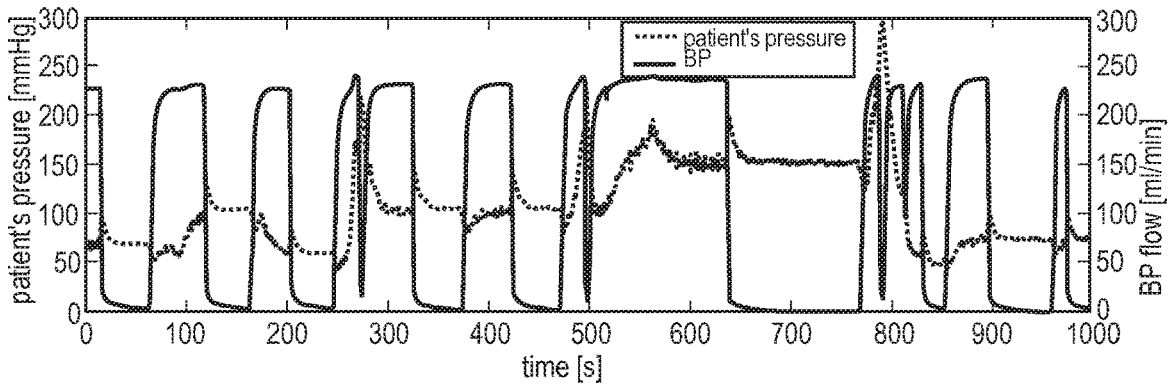
FIG. 10B shows a diagram, which shows the time course of a (simulated) blood pump flow and of a patient's blood pressure.

In the FIG. 10A the pressure curves of the first conventional pressure sensor PA_herk for measuring the arterial pressure and of a second conventional pressure sensor PBE_herk for measuring the dialyzer input pressure in comparison with the pressure curve of the second pressure reference sensor PV in mmHg over time t in s during the therapy are shown. The FIG. 10B shows a diagram in which the time courses of the blood pump flow in ml/min and of the simulated patient pressure in mmHg are shown which have been recorded at the same time as the pressure values from the FIG. 10A.

In the ranges in which the blood pump flow is 0, that means at the times at which the blood pump is stopped, the pressure signals of the PA_herk, PBE_herk and PV sensors adjust to each other and are constant. In these constant pressure ranges, the pressure curves of the two pressure sensors PA_herk and PBE_herk are essentially congruent, and there is a pressure difference to the pressure curve of the pressure reference sensor PV, which here is about 20 mmHg, and can be explained by the height difference between the pressure sensors PA_herk, PBE_herk and the pressure reference sensor PV.

Again it applies here that although the pressure difference between the conventional pressure sensor and the pressure reference sensor must be taken into account, the comparison in the FIG. 9 shows that the second pressure reference sensor is suitable as a reference sensor for the arterial pressure and the dialyzer input pressure during the therapy.

Temperature Drift

So far, the above description has assumed a constant internal pressure of the tube and a constant internal temperature of the tube. But between step b) and step c), that means between the phase prior to the therapy and the phase during the therapy, there may be temperature differences in the filled tube which can lead to linear deviations between the reference sensor value and the pressure sensor value.

Figure 11A:
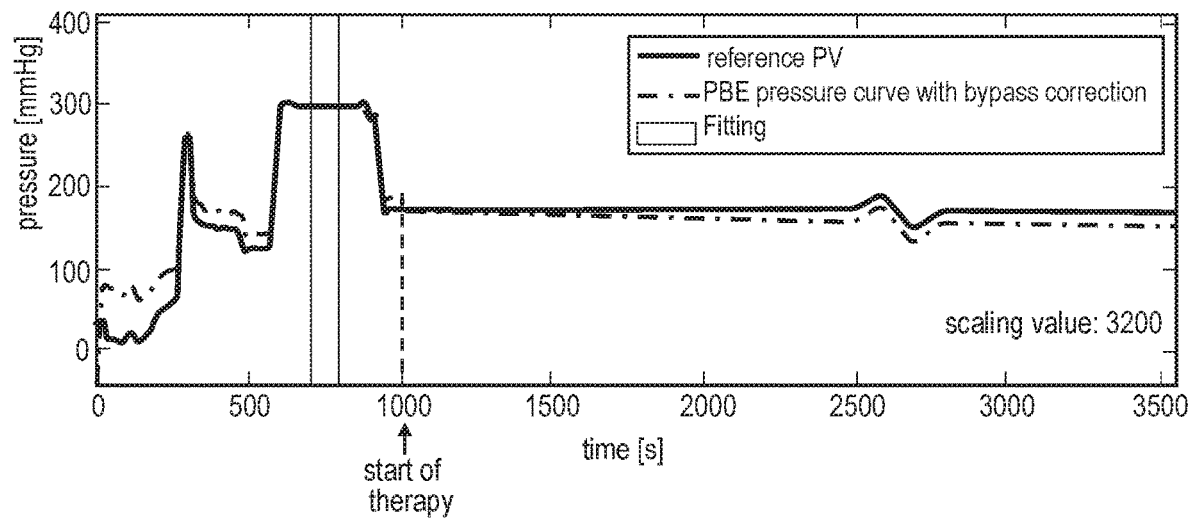
FIG. 11A shows a diagram, which shows a deviation between a calculated pressure signal and a reference signal due to a temperature drift.
Figure 11B:
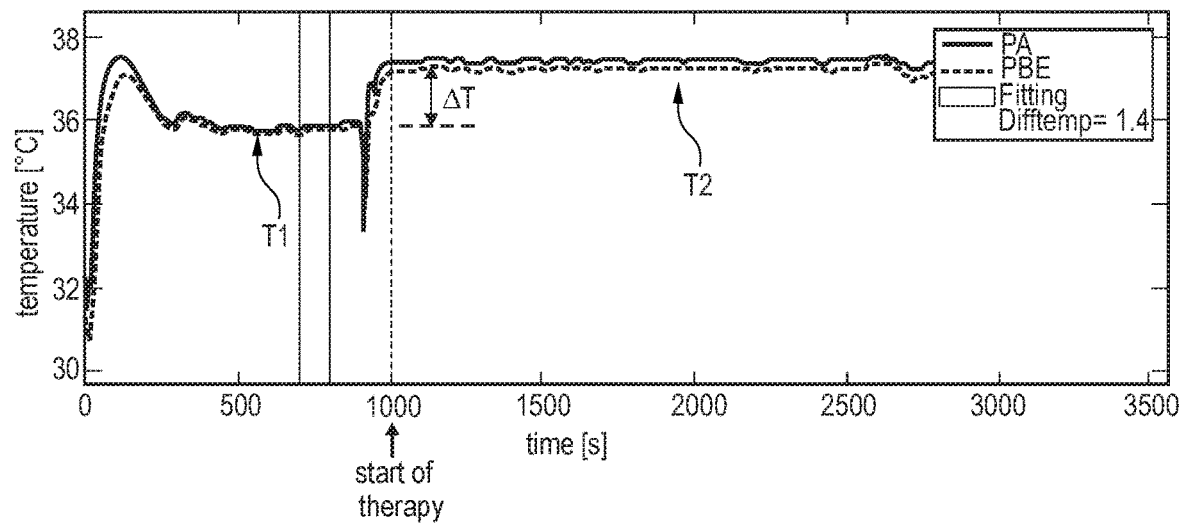
FIG. 11B shows a diagram, which is related to the diagram in FIG. 11A, and shows the temperature profile of a fluid in the tube at the first and at the second pressure sensor.

Such a deviation is shown by way of an example for the PBE pressure sensor and the PV pressure reference sensor in the diagram of the FIG. 11A. The FIG. 11B shows the associated temperature profile at the measuring points of the PBE pressure sensor and the PV pressure reference sensor. In order to be able to determine the temperature at these two measuring points, it is necessary to integrate a temperature sensor into the PBE clamping device and/or the PA clamping device. Here, the calibration before the therapy (up to about 900 s) takes place at T1, for example at 35.8° C., while the calibration during the therapy takes place at T2, for example at 37.2° C. Due to the temperature difference $\Delta T$ (=T2−T1) prior to the therapy and during the therapy, which here is 1.4° C., the calculated PBE pressure signal, which is shown in the FIG. 11B, does not follow the PV reference signal during the therapy, but deviates in a linear manner from it. Investigations have shown that the deviation between the pressure signal and the reference signal is linearly proportional to the temperature deviation prior to the therapy and during the therapy. The pressure signal can be corrected with the aid of an empirically determined correction function.

Figure 12A:
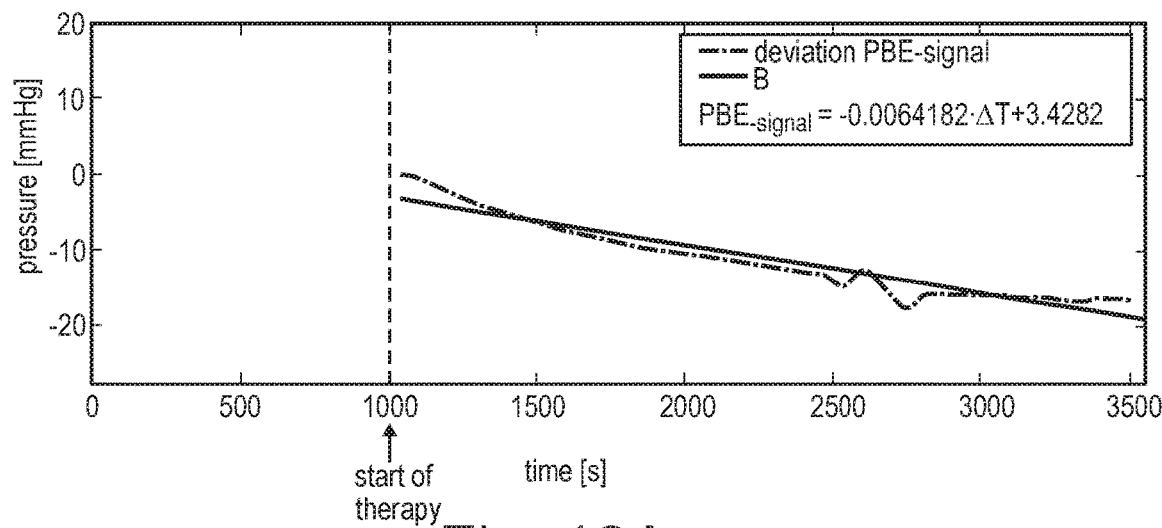
FIG. 12A shows a diagram, which shows the deviation of the pressure signal of the second pressure reference sensor from the corresponding pressure reference signal and a linear correction signal.

The FIG. 12A shows the pressure deviation between the pressure signal and the reference signal and a straight line B found for it over time t in s. In the example, the straight line equation has the following form which is shown in formula (8):

$$PBE_{Signal} = -0.0064182 [\text{mmHg}/^\circ \text{C.}] \cdot \Delta T [^\circ \text{C.}] + 3.4282 \ [\text{mmHg}] \quad (8)$$

Figure 12B:
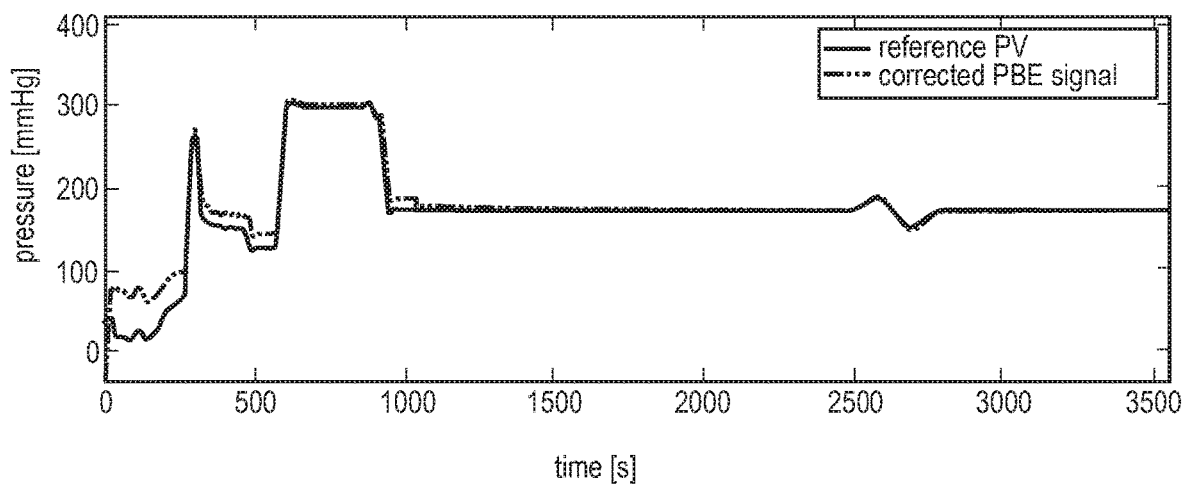
FIG. 12B shows a diagram, which is related to the diagram in FIG. 12A, and shows the curves of the pressure signal, which is corrected by the linear correction signal, and of the pressure reference signal.

The FIG. 12B shows the PBE pressure signal corrected with the aid of the determined formula (8) which is now again shown congruent with the PV reference signal.

As an alternative to a linear relationship between the deviation between the pressure signal and the reference signal to the temperature deviation prior to the therapy and during the therapy, a polynomial relationship can also exist. But more computing power is required in order to calculate the corresponding formula, even though such a relationship can represent the deviation more precisely than a linear one.

Figure 13A:
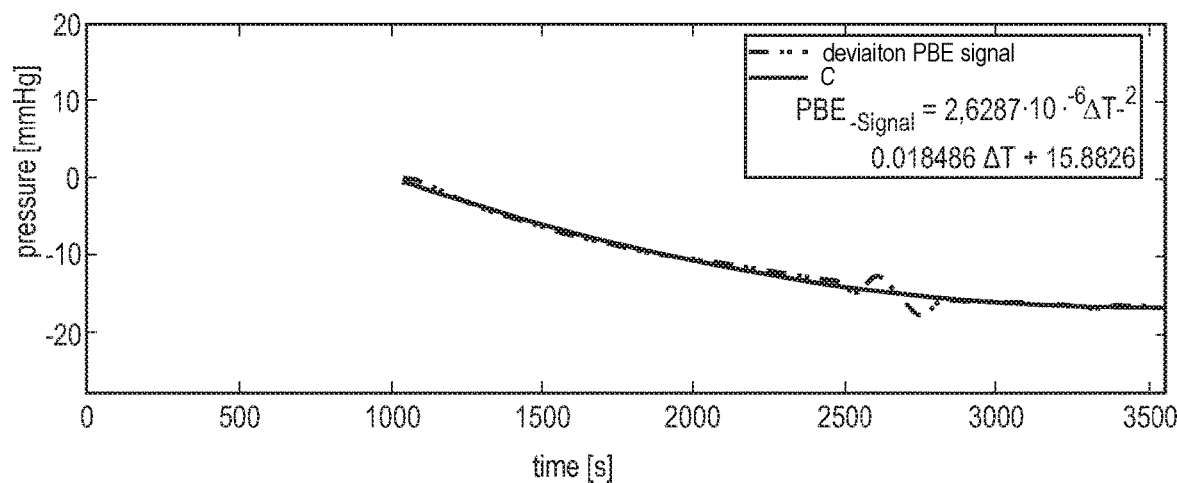
FIG. 13A shows a diagram, which shows the deviation of the pressure signal of the second pressure reference sensor from the corresponding pressure reference signal, and a polynomized correction signal.
Figure 13B:
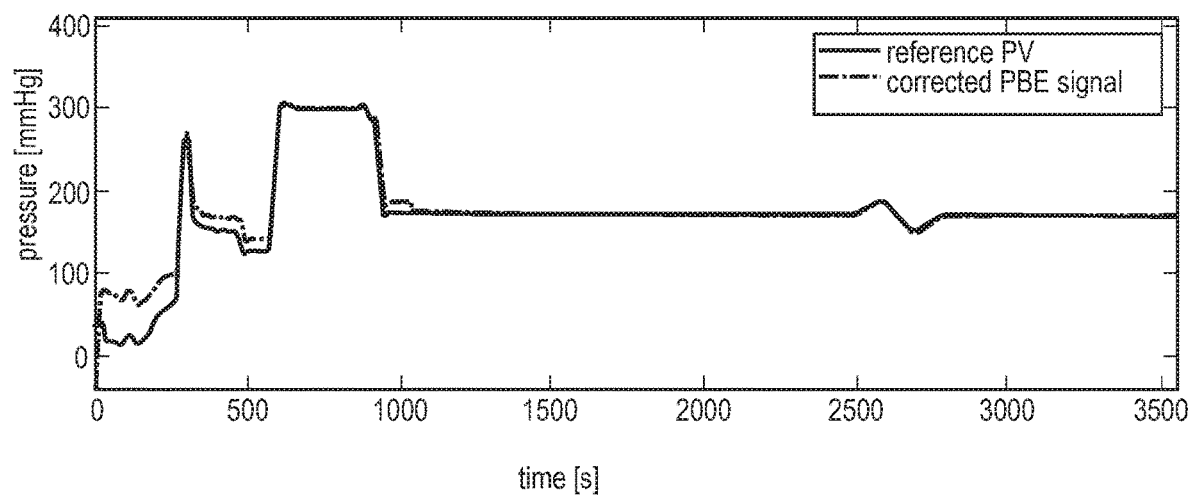
FIG. 13B shows a diagram, which is related to the diagram of FIG. 13A, and shows the curves of the pressure signal, which is corrected by the polynomized correction signal, and of the pressure reference signal.

The FIG. 13A shows, like the FIG. 12A, the pressure deviation between the pressure signal and the reference signal and a polynomial C which has been calculated for it over time t in seconds. In the example, the PBE pressure signal follows the polynomial deviation which is shown in formula (9):

$$PBE_{signal} = 2.6287 \cdot 10^{-6} \cdot [mmHg/°C.^2] \Delta T^2[°C.^2] - 0.018486[mmHg/°C.] \cdot \Delta T[°C.] + 15.8826 \; [mmHg] \quad (9)$$

The FIG. 13A shows the PBE pressure signal, which has been corrected by means of the determined formula (9) which is now again shown to be congruent with the PV reference signal.

Modification of the First Embodiment

The reference pressure measurement of the pressure signals PBE and PA in the step c) (during the therapy) can alternatively also be performed with the venous tube clamp SAKV closed and with the arterial tube clamp SAKA closed.

For this purpose, the dialyzer flow is switched to the bypass, as in the first embodiment, and the tube clamps SAKV and SAKA are being closed. A pressure tight connection is being created in the tube. The blood pump BP is stopped. But due to the delay, the blood pump BP continues to rotate for a short time after stopping, so that a negative pressure builds up in the arterial tube section and a positive pressure builds up in the venous tube section, which have the same pressure ratio to each other over time, that means that they have a fixed ratio to each other. The PBE pressure signal is calibrated by means of the PV pressure reference sensor. The PA pressure signal can be calibrated as well by means of the PV pressure reference sensor.

Since the patient is cut off from the extracorporeal circuit due to the closed tube clamps SAKV and SAKA, this alternative version in step c) can be carried out independently of the patient. But in this case, the blood no longer circulates in the extracorporeal circuit, so that blood clots can form in the extracorporeal circuit, and the temperature can drop. But the clotting of the blood and its temperature drop depend on the duration of the blood pump stop which should therefore be as short as possible.

Summary

In summary, according to the first embodiment of the disclosure, a method for calibrating a first force sensor/a first pressure sensor is provided, which measures a first pressure, in particular an arterial pressure, for example in an extracorporeal (blood) circuit, in the form of a force signal, within a (first) tube filled with fluid, preferably a dialyzer tube (blood tube). The pressure sensor is directly connected to the (first) tube and is integrated/is inserted into a first clamping device in order to correct a drift signal, which caused by the (first) tube by a correction function with the aid of a pressure reference signal which is picked up by a first (separate) pressure reference sensor. For this purpose, the following steps are carried out in accordance with the disclosure:

a) Recursive analysis and prediction of at least one correction function for finding a correction signal for correcting the drift signal by means of a/the corresponding pressure reference signal which is measured by the first pressure reference sensor at constant internal pressure of the tube and at constant internal temperature of the tube;

b) first calibrating of the force signal, measured by the first force sensor and corrected by means of the correction signal, with the pressure reference signal which is measured by the first pressure reference sensor prior to an active use of the tube; and c) second calibrating of the force signal, measured by the first force sensor and corrected by means of the (previously predicted) correction function, with the pressure reference signal which is measured by a second (separate) pressure reference sensor during an active use of the tube.

In other words, a method for an online correction of a force-pressure signal is provided, which, in accordance with the disclosure, is applied to a filled (first) tube before and during an active use of the (first) tube. This means that a first calibration of a (test/simulation) force signal generated by a first force sensor is at first carried out prior to an active use of the (first) tube by means of a pressure reference signal which has been determined by means of a pressure reference sensor and a correction function. Then a second calibration of a (second) force signal already corrected by means of the correction function is carried out during an active use of the tube, namely on the basis of a pressure reference signal which is/has been preferably generated by a second pressure reference sensor.

Specifically, a mathematical correction function and a two point calibration are applied for this purpose in such a way that an absolute pressure measurement is possible. The pressure measurement is carried out via a/the force sensor which is being integrated into a/the clamping device. The mathematical correction function is determined at constant internal pressure of the tube and constant internal temperature of the tube, preferably within a few minutes after the insertion of the (first) tube into the clamping device, from the measured (test) force—pressure signal and a reference pressure, which is determined via a/the (separate) pressure reference sensor (which has a different structure and/or different installation compared with the force sensor), and provides a drift signal. The pressure reference sensor preferably has a higher measuring accuracy than the corresponding pressure/force sensor. A/the first calibration is then carried out in which the internal pressure of the tube and the internal temperature of the tube are constant during the recording of the pressure/force signal for determining the correction function. During a subsequent recalibration (second calibration), the (first) tube is subjected to a constant, known pressure and the correction function is determined again from the pressure data which have been measured during this period. Such a reference method thus comprises a calibration procedure not only prior to an active use of the tube but also during an active use of the tube, that means that the reference method is carried out prior to and during a (dialysis) therapy on the patient.

Such a method enables the pressure measurement via a clamping device directly on the filled (first) tube as a part of a tubing system. With this type of pressure measurement, the Luer lock connections, which are used in the prior art, are not required in the area of the clamping device. This results in lower manufacturing costs for the tubing system, and an improved usability. The improved usability of the tubing system can be justified by the fact that, compared with conventional systems, fewer connectors have to be connected, and thus a machine, which is using such a tubing system, can be set up more quickly, leakages occur less frequently, and the tubing system is more clearly arranged. Furthermore, this tubing system has the advantage that a tube fluid-air contact is reduced and/or avoided. In the case where the fluid/liquid which is flowing through the (first) tube is blood, the risk of blood clotting is thus reduced. As a result, fewer anticoagulants need to be added to the blood which reduces treatment costs. In addition to that, there is no wear on the pressure connections on the machine side (Luer lock connections), and the risk of contamination due to pressure measurement is suppressed.

An advantage of the method in accordance with the disclosure is, however, that a reference measurement during an active use of the (first) tube provides significantly more accurate values than a sole reference measurement before an active use of the tube. The correction function, which is determined in the method in accordance with the disclosure, can be carried out independently of the tube material or the tube dimensions, and can therefore also be used universally for unknown tube systems.

The method can be carried out in such a way that, in addition to the first pressure, a second pressure, which is measured with a second force sensor/a second pressure sensor integrated into a second clamping device, can be measured and corrected. In this context, the force signal of the second force sensor is calibrated during the first calibration and during the second calibration with the pressure reference signal which is measured by the second pressure reference sensor. In this way, the internal pressures of the tube can be measured and corrected at two different locations in an extracorporeal circuit without a fluid-air contact.

A further aspect of the method in accordance with the disclosure provides that the (first) tube (for example an extracorporeal blood tube of a dialysis machine or a blood pump) comprises an arterial section (blood inlet section) and a venous section (blood outlet section). In this context, the first and/or the second pressure/force sensor and the first pressure reference sensor are preferably arranged at the arterial section. The second pressure reference sensor, which may be a pressure/force sensor for checking the internal pressure of the tube in the venous section, which is (the only one) not cooperating with a clamping device, is arranged at the venous section. This means that the pressure in the venous section of the (first) tube is measured (as the only one) via the second pressure reference sensor, preferably in accordance with a conventional pressure measurement method, for example, via a T-piece or a flexible membrane (with increased accuracy). This means that the second pressure reference sensor (as the only one) is further preferably connected via a Luer lock connection to the machine to which the (first) tube is connected. The referencing is thus performed by means of a pressure reference sensor, which is more expensive compared with the sensor integrated into a clamping device, but has a higher accuracy. The first pressure reference sensor is arranged in the area of the arterial tube section and preferably has a piezoelectric element for the pressure measurement.

Furthermore, it can be provided that the constant internal pressure of the tube can be achieved by adjusting a pump ratio between a first pump, in particular a blood pump, and a second pump, in particular a dialysate input flow pump or a dialysate output flow pump. It is particularly reliable and simple to achieve a constant pressure in the tube by adjusting a pumping ratio between these two pumps. For the method in accordance with the disclosure a constant pressure in the filled tube is of essential importance.

Furthermore, the method may be realized in such a way that the drift signal is and/or corresponds to the restoring force of the clamped tube.

In addition to that it is conceivable that the (corrected) force signal is converted into a pressure signal by means of the corresponding pressure reference signal via a linear recursion, and/or that the force signal is being calibrated with the pressure reference signal. This linear recursion enables a simple calculation of the pressure signal from the respective force signal.

Preferably, in the case of two force sensors used, the first force sensor is arranged, in particular integrated, at an inlet opening/a blood inlet of the first pump, and the second force sensor is arranged, in particular integrated, at an outlet opening/at a blood outlet of the first pump. Since in this case the tube material at the position of the force sensors, the temperature in the tube and the insertion time of the tube into the corresponding clamping devices are identical, the expected drift behavior at the positions of the two force sensors should be identical as well.

Furthermore, in accordance with the first embodiment of the present disclosure, a device is provided which has an extracorporeal circuit and at least one pressure/force sensor, in particular an arterial pressure/force sensor and/or a dialyzer input pressure/force sensor. This pressure/force sensor is integrated into a clamping device for measurement of the internal pressure of the tube in a fluid filled tube with arterial and venous sections. Furthermore, the device has at least one pressure reference sensor for referencing a pressure signal/a force signal which is emitted by the at least one pressure sensor. The at least one pressure reference sensor, in particular an arterial reference sensor and/or a venous pressure reference sensor, is not designed as a clamping device and/or is not intended to be integrated into a clamping device (design without a clamping device). Furthermore, the device preferably comprises at least a first pump and a second pump. The device is provided and adapted to apply the method for calibrating the pressure signal of the at least one pressure sensor by means of a reference signal of the at least one pressure reference sensor in accordance with at least one of the preceding aspects of the disclosure.

Finally, in accordance with the first embodiment of the present disclosure, a calibration device is provided for calibrating the measurement of at least a first (internal) pressure of the tube, preferably an arterial pressure. This first pressure is measured in the form of a force signal in a fluid circuit, in particular an extracorporeal (blood) circuit inside a tube (not part of the device) filled with the fluid/liquid/blood, by means of a first pressure sensor/force sensor of the calibration device which is directly adjacent to the tube or can be caused to be directly adjacent to the tube (on the outside). In this context, the pressure/force sensor is integrated into a first clamping device. The first pressure is calibrated in order to correct a drift signal caused by the (first) tube (tube material) by a correction function with the aid of a pressure reference signal picked up/generated by a first pressure reference sensor of the calibration device. The calibration device has the following units or sections:

a) a first computing section (CPU unit/program step) which is provided and adapted for the analysis and the prediction of at least one correction function for finding a correction signal for correcting the drift signal by means of a corresponding (force/) pressure reference signal which is measured/generated by the first pressure reference sensor at constant internal pressure of the tube and constant internal temperature of the tube;

b) a second computing section (CPU unit/program step) which is provided and adapted for the first calibration of the force signal, measured by the first pressure/force sensor (PA) and then corrected by means of the correction signal, with the pressure reference signal, which is measured/generated by the first pressure reference sensor, prior to an operational use of the tube; and c) a third computing section (CPU unit/program step) which is provided and adapted for the second calibration of the force signal, measured by the first pressure/force sensor and then corrected by means of the correction signal, with the (force/) pressure reference signal, which is measured/generated by a second pressure reference sensor during an active (operational) use of the tube.

Second Embodiment

The second embodiment according to the invention is substantially based on the first embodiment, so that in the following essentially only the differences from the first embodiment are being explained.

In the first embodiment, the first pressure sensor PA and the second pressure sensor PBE, which are pressure sensors on the arterial section 1a of the tube 1, are designed as pressure sensors or force sensors integrated/inserted into clamping devices. In the venous section 1b of the tube 1, on the other hand, a conventional pressure sensor (force or pressure reference sensor PV) required for referencing/calibrating, which is realized, for example, as a T-piece or a pressure pod, is provided.

In the second embodiment according to the invention, a (third) pressure sensor PV is also provided in the venous section 1b of the tube, which is designed as a pressure sensor or a force sensor integrated/inserted into a clamping device. Thus, no conventional pressure transducer connected via a Luer lock connection is used anymore for the three/for all pressure sensors PA, PBE, PV measuring the blood pressure. The second embodiment according to the invention substantially provides a method and a device for referencing/calibrating on the dialysate side/dialysis fluid side.

The second embodiment according to the invention is described in the following with reference to the FIGS. 14 to 19.

Figure 14:
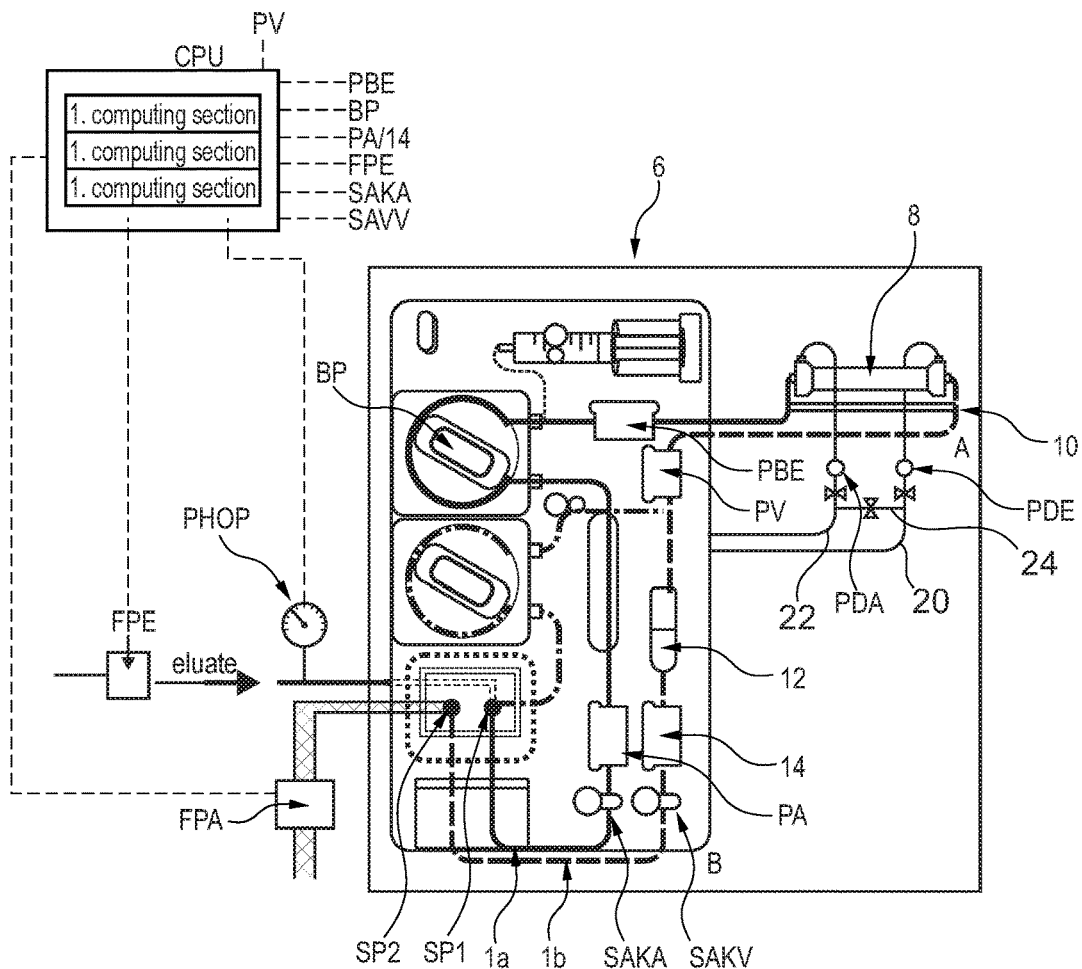
FIG. 14 shows a front of a dialysis machine in a state prior to an active use of the tube in accordance with a second embodiment.

The FIG. 14 shows the front of a dialysis machine 6, to which a (first) tube 1 is attached, the internal pressure of which is to be measured at various points. The dialysis machine 6 has an extracorporeal circuit. The tube 1 has an arterial section/branch 1a and a venous section/branch 1b. Via a first substitute port SP1, the arterial section 1a of the tube 1 is connected to the machine 6, and via a second substitute port SP2, the venous section 1b of the tube 1 is connected to the machine 6. In the embodiment, which is shown in FIG. 14, the tube 1 is not (yet) connected to a patient, this means that the tube is not in an active use and therefore in a state prior to the therapy. For this reason, the tube 1 is not filled with blood here but with another fluid, which is an eluate here.

The fluid is first conveyed into the arterial tube section 1a via an input flow pump FPE which is arranged outside the front of the dialysis machine 6. Even before the fluid is in the area of the front of the dialysis machine 6, a first pressure reference sensor PHOP takes the internal pressure of the tube and/or measures the internal pressure of the tube. Thus, the pressure reference sensor PHOP is also located at the substitute port SP1 and is an additional pressure sensor compared with conventional dialysis machines 6. After the fluid has entered the front of the dialysis machine 6, it first passes the arterial tube clamp SAKA which is usually open. Subsequently, the fluid passes the first clamping device, which is also referred to as a PA pressure sensor and/or the first pressure sensor PA, and thus the first force sensor. The first clamping device is integrated into the front side of the dialysis machine 6. The PA sensor is measuring the pressure in the arterial section 1a of the tube 1. The pressure reference sensor PHOP can be used in order to reference the first pressure sensor PA, because it has a higher measuring accuracy than the first pressure sensor PA.

Subsequently, the fluid reaches the first pump, a blood pump BP which continues to convey the fluid. Finally, the fluid passes a second clamping device which is also referred to as a PBE pressure sensor and/or the second pressure sensor PBE, and thus the second force sensor. The PBE pressure sensor measures the dialyzer input pressure at a point downstream of the blood pump BP in the direction of the flow of the medium in the tube. After the PBE pressure sensor, the fluid can pass through a dialyzer 8. But in the case of a bypass circuit via the bypass 10, it is also possible that the fluid does not flow through the dialyzer, but bypasses the same. Downstream of the dialyzer/bypass in the direction of the fluid flow is the venous tube section 1b (which is shown here as a dashed line). At a point downstream of the dialyzer/bypass and upstream of an air trap 12, in which air trapped in the fluid is removed from the fluid, the fluid in the venous tube section 1b passes a third clamping device, also referred to as a PV pressure sensor and/or the third pressure sensor PV, and thus the third force sensor. The PV pressure sensor is measuring the dialyzer output pressure at a point downstream of the dialyzer 8. But the PV pressure sensor may as well be located only downstream of the air trap 12, as this is the case, for example, in the set up of FIG. 16 in which a therapy mode is shown.

As it is further shown in the FIG. 14, after the PV measuring point, the fluid passes through the deaerator 12, then through an air detector 14, and finally through a venous tube clamp SAKV. After the fluid has passed the venous tube clamp SAKV, it flows out via the substitute port SP2 with the aid of a pump capacity of an output flow pump FPA which is arranged outside the front of the dialysis machine 6.

Figure 16:
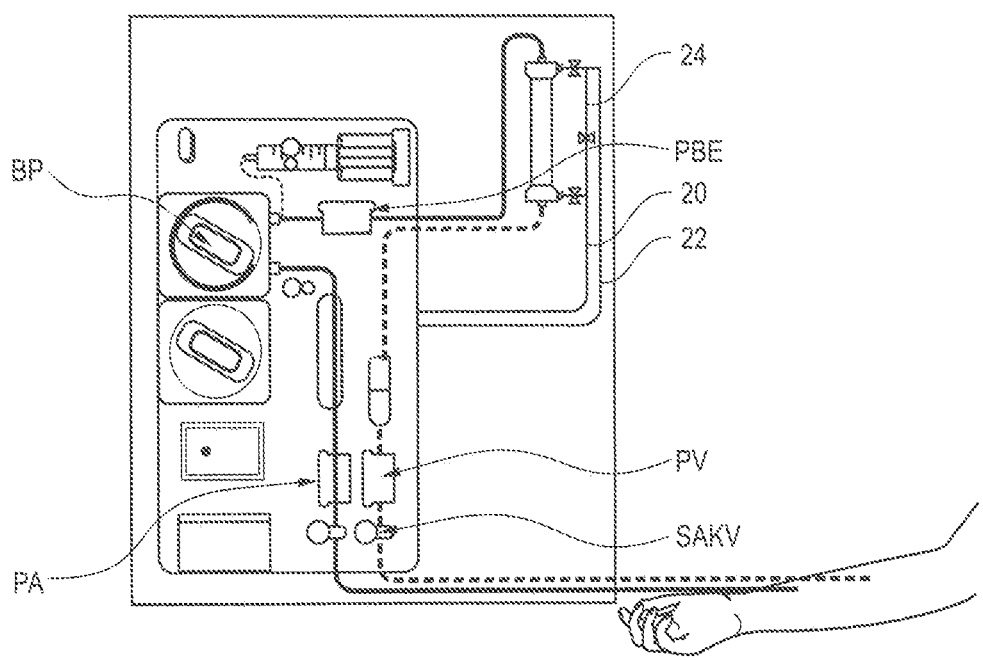
FIG. 16 shows a front of a dialysis machine during an active use of the tube with a patient, who is connected to the machine, in accordance with the second embodiment.

During the therapy, the arterial and the venous tube sections 1a and 1b are connected to the patient (see FIG. 16). In this case, the heart of the patient replaces the input and the output flow pumps FPE and FPA. The air detector 14 is not depicted in FIG. 16, but is preferably also provided during the therapy.

Figure 15:
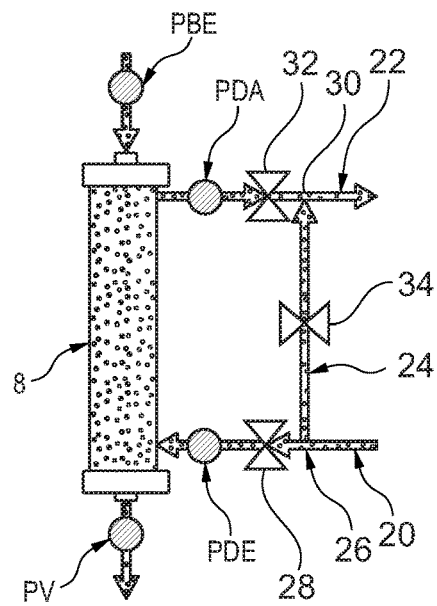
FIG. 15 shows pressure measurement points in an area around a dialyzer in accordance with the second embodiment.

As it is shown in the FIGS. 14, 15, and 16, the dialysis machine 6 includes a dialysis fluid inlet tube/line 20 and a dialysis fluid outlet tube/line 22. A bypass line/a bypass tube 24 branches off from the dialysis fluid inlet tube 20 at a first branch point 26. Downstream of the first branch point 26, a first shut off valve 28 is provided. The first shut off valve 28 is configured to allow or prevent a fluid flow through/in the dialyzer 8. A second branch point 30 is provided at the dialysis fluid outlet tube 22, at which the bypass line 24 passes into the dialysis fluid outlet tube 22. A second shut off valve 32 is provided on the dialysis fluid outlet tube 22 upstream of the second branch point 30. The second shut off valve 32 is arranged to allow or prevent a fluid flow through/in the dialyzer 8. A third shut off valve 34 is provided at the bypass line 24. The third shut off valve 34 is arranged to allow or prevent a fluid flow through the bypass line 24.

On the dialysis fluid inlet tube 20 downstream of the first shut off valve 28 and upstream of the dialyzer 8 a force reference sensor or a pressure reference sensor PDE is provided on the dialysis fluid inlet side. On the dialysis fluid outlet tube 22 a force reference sensor or a pressure reference sensor PDA is provided on the dialysis fluid outlet side downstream of the dialyzer 8 and upstream of the second shut off valve 32.

According to the invention, however, only one of the force reference sensors or the pressure reference sensors PDE and PDA, preferably the force reference sensor or the pressure reference sensor PDA, can in principle also be provided. This means that either only the force reference sensor or pressure reference sensor PDA or only the force reference sensor or pressure reference sensor PDE or not only the force reference sensor or pressure reference sensor PDA but also the force reference sensor and pressure reference sensor PDE can be provided.

The FIG. 14 shows that the dialysis machine 6 is connected to a CPU which comprises a first computing section, a second computing section, and a third computing section. In this regard, the CPU can control the input flow pump FPE, the output flow pump FPA, the pressure reference sensor PHOP, the pressure reference sensor PDA, the pressure reference sensor PDE, the first pressure sensor PA, the second pressure sensor PBE, the third pressure sensor PV, the blood pump BP, the arterial tube clamp SAKA, the venous tube clamp SAKV, the first shut off valve 28, the second shut off valve 32, and the third shut off valve 34, etc., and/or receive information/signals from the sensors.

In particular, the CPU can control the shut off valves 28, 32, 34 in such a way that the dialysis fluid/the dialysate optionally flows via the dialyzer 8 or the bypass line 24. In a case in which the first shut off valve 28 and the second shut off valve 32 are closed and the third shut off valve 34 is open, the dialysis fluid is flowing through the bypass line 24 and not through the dialyzer 8. This operation is hereinafter referred to as a bypass operation. In a case in which the first shut off valve 28 and the second shut off valve 32 are open and the third shut off valve 34 is closed, the dialysis fluid flows through the dialyzer 8 and not through the bypass line 24. This operation is hereinafter referred to as the main connection operation.

As it has already been explained, the PBE pressure sensor, which measures the pressure at the inlet of the dialyzer 8, and the PV pressure sensor, which measures the pressure at the outlet of the dialyzer 8, are to be designed as force sensors or pressure sensors which are being integrated/inserted into clamping devices (so called clamp on sensors). In order to be able to operate the PBE pressure sensor and the PV pressure sensor with a desired accuracy, these must basically be referenced/calibrated. According to the invention, this referencing/calibrating is carried out by means of a reference measurement on the dialysis fluid side via at least one sensor from the force reference sensor or the pressure reference sensor PDA and the force reference sensor or the pressure reference sensor PDE.

Figure 17:
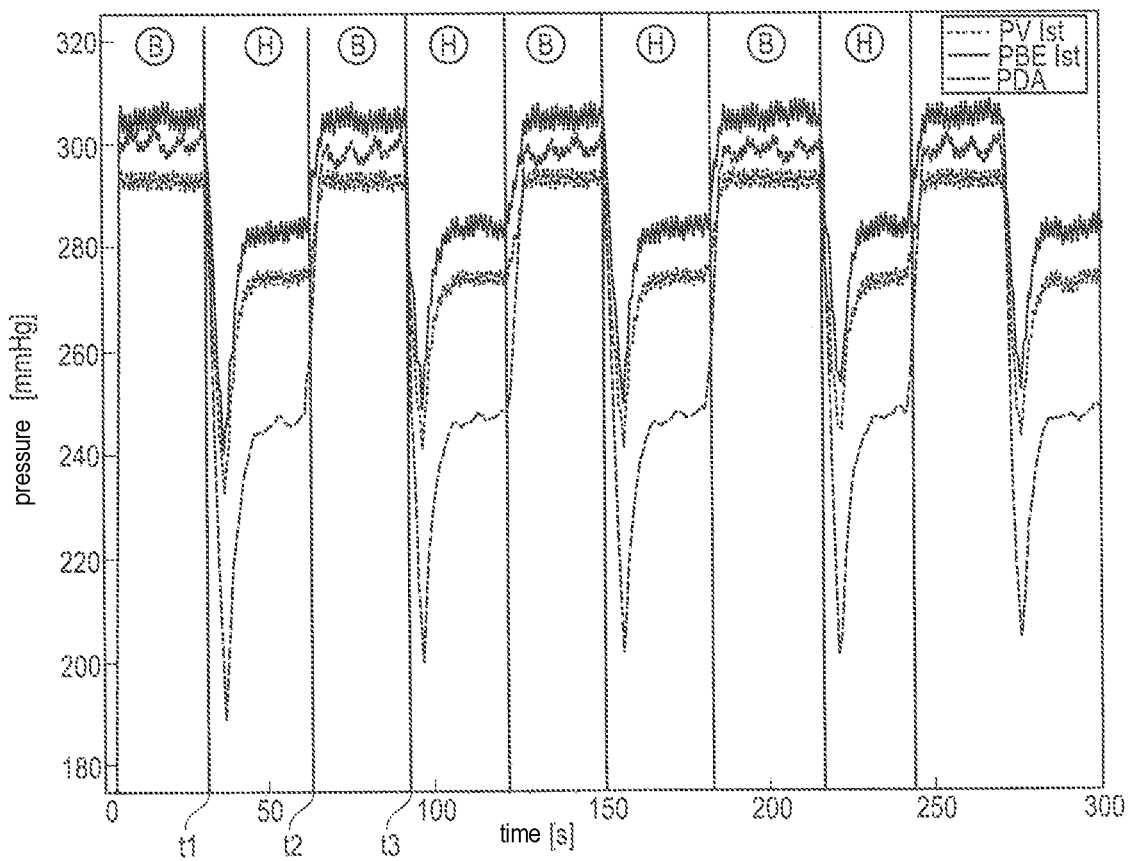
FIG. 17 shows a pressure curve of sensors in accordance with the second embodiment.

The referencing/calibrating can basically be done via pressure equalization curves. A typical pressure equalization curve is shown in the FIG. 17. The FIG. 17 shows actual pressure curves of PV (PV_Actual), of PBE (PBE_Actual) and of PDA. In particular, the course of a test measurement can be seen, in which an alternating switching between the bypass operation B and the main series operation H has been carried out. A switch over takes place in each case at the times t1, t2, t3, etc. which are marked on the time axis.

It can be seen that after the switching over from the main connection operation H to the bypass operation B, the pressures are equalizing after about 10 seconds. In particular, when the dialysis fluid flow through the dialyzer 8 is stopped (bypass operation), a pressure equalization between the blood side and dialysis fluid side/dialysate side can occur via the semipermeable filter membrane of the dialyzer 8. Against this background, the referencing/calibrating takes place preferably in the bypass operation B.

Basically, in order to carry out the referencing/calibrating, all relevant influencing factors, which affect the profiles of the pressure equalization curves must be known, and must be passed to account and taken into consideration.

Among other things, it must be taken into account here as to whether the pressure equalization curve has been recorded with the blood side running (dynamic case) or with the blood side not running (static case). The pressure equalization curve, which is shown in the FIG. 17, for example, has been recorded in the static case with the blood side not running. In the dynamic case, for example, a pulsation of the blood pump roller rotors would have to be taken into account in addition which affects the blood pressure curve. But since the pulsation of the blood pump roller rotors propagates in the system in a known manner, it can be taken into account in a simple manner via a mean value filter.

In addition to that, the offset variation/the offset deviation of the curves must also be taken into account. The offset variation depends, for example, on the pressure difference between the blood side and the dialysis fluid side, the size of the dialyzer, the volume on the dialysis fluid side, as well as on the position of the pressure transducers and/or on the relative position of the pressure sensors to each other which can be included via a gravity pressure of a water column. For example, a referencing/a calibrating can in principle be carried out not only in the bypass operation B but also in the main connection operation H, if the offset deviation/the offset variation/the pressure difference is taken into account and/or compensated for via a correction value.

With regard to the adjustment times, it should be taken into account that these depend on a number of factors, such as, for example, on the pressure difference between the blood side and the dialysis fluid side, the size of the dialyzer, the volume on the dialysis fluid side, the compliance/the volume expandability/the flexibility of the tubing system, as well as on the position of the pressure transducers, which are preferably located as close as possible to the dialyzer 8, preferably directly on a flushing bridge.

Furthermore, the influence of the dialyzer must also be taken into account. In other words, a dialyzer specific calibration must also be carried out. It is conceivable, for example, that for calibrating/for referencing an average value from a large number of different dialyzer calibration curves is calculated by the CPU of the dialysis machine. It is conceivable as well that the dialyzer is characterized in a preparation phase by applying a constant pressure in order to determine a transmembrane pressure.

Figure 18A:
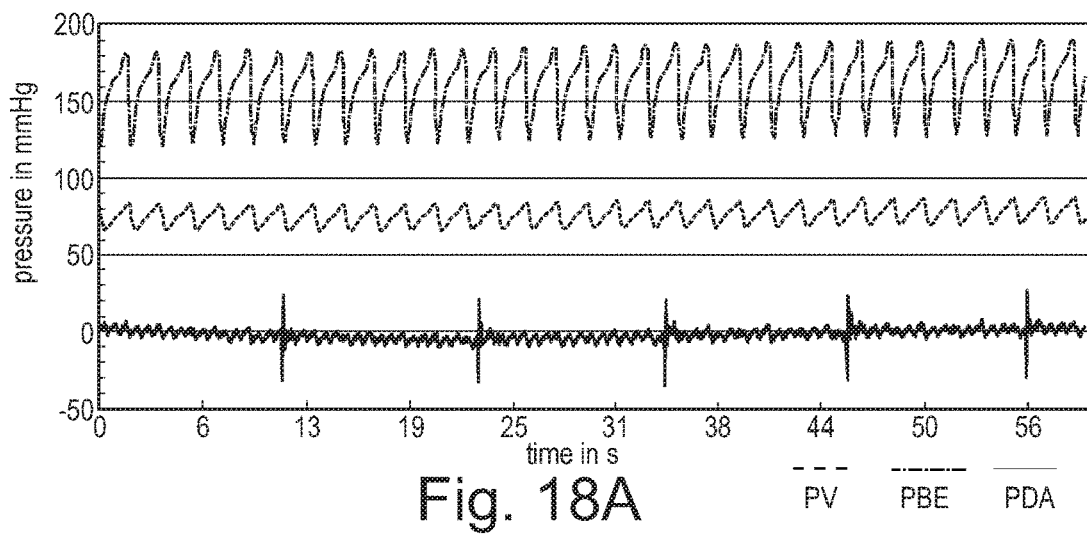
FIG. 18A shows a pressure behavior when a dialyzer with a low permeability is being used.
Figure 18B:
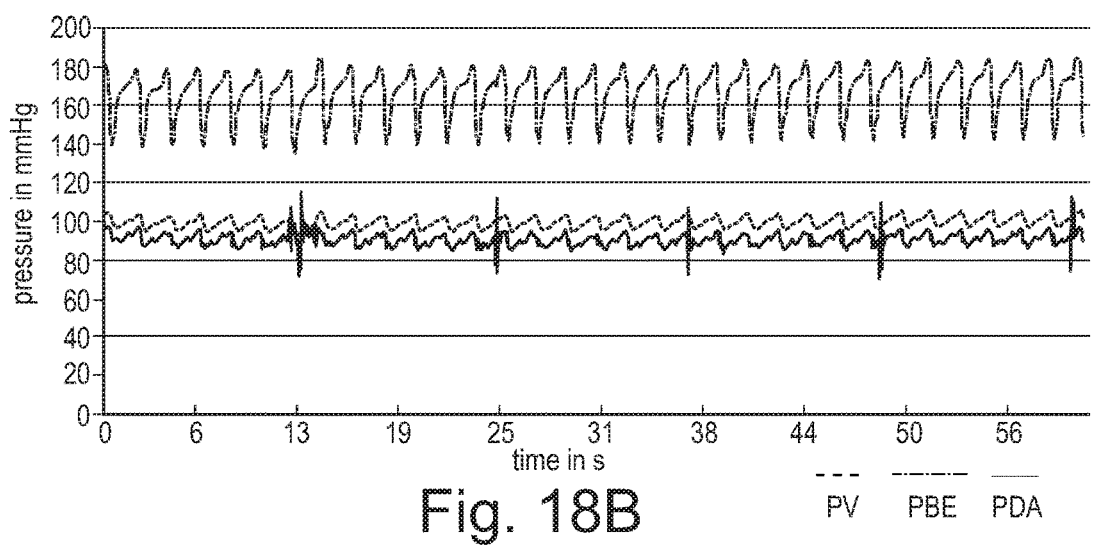
FIG. 18B shows a pressure behavior when a dialyzer with a high permeability is being used.

The FIG. 18A and the FIG. 18B show as to how the dialyzer 8, in particular a semipermeable membrane of the dialyzer 8, can affect and/or influence the pressure curve. The FIG. 18A and the FIG. 18B in each case are showing pressure curves for PV, PBE and PDA. In this context, the FIG. 18A shows the pressure behavior at a low permeability of the dialyzer 8, in particular of the semipermeable membrane of the dialyzer 8, as well as at an ultrafiltration rate which is greater than 0. The FIG. 18B, on the other hand, shows the pressure behavior at a high permeability of the dialyzer 8, in particular of the semipermeable membrane of the dialyzer 8, as well as at an ultrafiltration rate which is greater than 0. In other words, the permeability of the dialyzer 8 in the FIG. 18A is lower than the permeability of the dialyzer 8 in the FIG. 18B. With this in mind, the FIG. 18A and the FIG. 18B illustrate that a dialyzer specific calibrating/referencing is required when a force sensor or a pressure sensor in the extracorporeal circuit is being referenced/calibrated via a force reference sensor or a pressure reference sensor in the dialysis fluid circuit.

Figure 19:
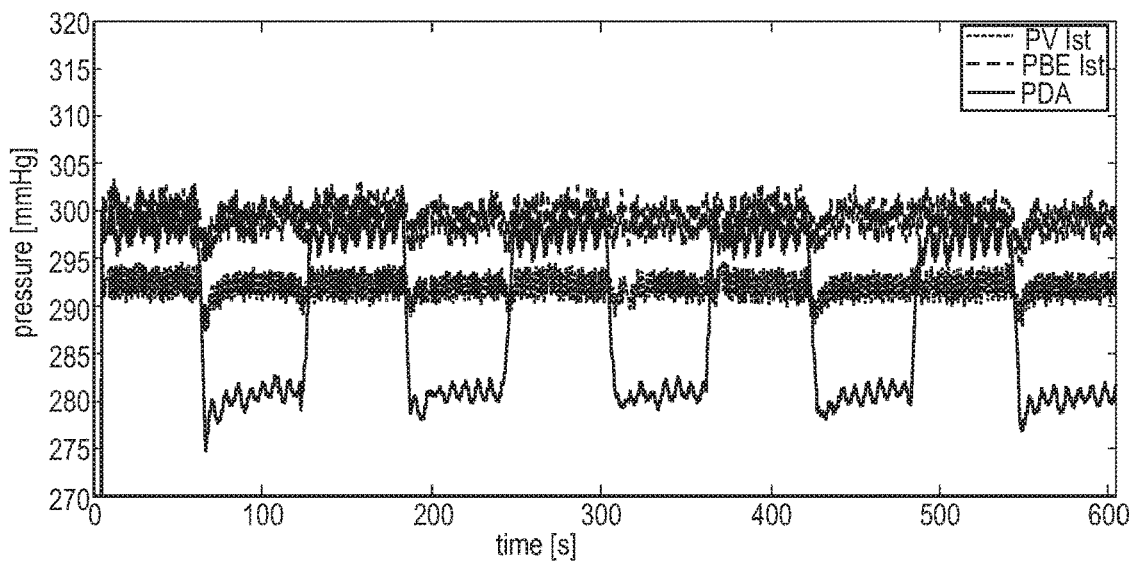
FIG. 19 shows a pressure behavior of sensors after an offset correction.

As soon as all influencing factors are known and are passed to account, there is a good conformity between PV and PDA/PDE and a referencing is possible. In this respect, the FIG. 19 shows a pressure curve of PV_Actual, PBE_Actual and PDA after an offset correction.

With respect to FIG. 16, a referencing/a calibrating is suggested as follows: the blood pump BP continues to rotate (running blood side and/or dynamic case), and the dialysis fluid flow is switched to the bypass operation B. After 10 seconds, a referencing of PV via PDA takes place, and a correction of the force sensor measurement at PV is carried out. Alternatively, a referencing of PV via PDE (and/or PDA) may be carried out. Since the PDE sensor is located on the inlet side of the dialyzer 8, a negative pressure is created here when the blood pump and the bypass circuit are running which negative pressure is different from PV. When, however, the venous tube clamp SAKV is being closed, and the blood pump is being stopped, the same pressure is present at all pressure sensors PBE, PV, PDA and PDE, and a referencing/a calibrating can take place. The only disadvantage in this context is that the lack of blood circulation can lead to a blood clotting.

The invention claimed is:

1. A method for calibrating at least one pressure or force sensor, which is configured to measure a tube internal pressure in an extracorporeal circuit tube, which is filled with fluid, wherein the at least one pressure or force sensor is integrated into or inserted in a clamping device, the method comprising:
   locating the at least one pressure or force sensor in an extracorporeal circuit of a dialysis machine;
   locating at least one dialysis fluid side force or pressure reference sensor in a dialysis fluid circuit of the dialysis machine, wherein the at least one dialysis fluid side force or pressure reference sensor is not provided in a clamping device;
   receiving a pressure or force signal from the at least one pressure or force sensor;
   receiving a dialysis tube internal pressure in the dialysis fluid circuit from the at least one dialysis fluid side force or pressure reference sensor; and
   calibrating the pressure or force signal from the at least one pressure or force sensor based on the received dialysis tube internal pressure in the dialysis fluid circuit;
   wherein the dialysis machine comprises a dialyzer having a semipermeable filter membrane between the extracorporeal circuit and the dialysis fluid circuit, and the at least one dialysis fluid side force or pressure reference sensor is arranged on a dialysis fluid inlet tube of the dialyzer, or on a dialysis fluid outlet tube of the dialyzer;
   wherein the method further comprises:
      providing a bypass operation in which a dialysis fluid in the dialysis fluid circuit does not flow through the dialyzer but does flow through a bypass line, and a main connection operation in which the dialysis fluid flows through the dialyzer,
      switching from the main connection operation to the bypass operation, and
      waiting for a predetermined period of time to allow a pressure equalization to occur in the dialyzer between the dialysis fluid circuit and the extracorporeal circuit across the semipermeable filter membrane of the dialyzer before calibrating the pressure or force signal.

2. The method according to claim 1 wherein:
   the at least one pressure or force sensor comprises a venous pressure or force sensor arranged on a venous section of the extracorporeal circuit tube downstream of the dialyzer.

3. The method according to claim 2, wherein the at least one dialysis fluid side force or pressure sensor is arranged on the dialysis fluid outlet tube of the dialyzer, and the method further comprises:
   operating a pump which delivers extracorporeal fluid through the extracorporeal circuit tube; and
   after waiting the predetermined period of time, and while operating the pump which delivers extracorporeal fluid through the extracorporeal circuit tube, calibrating the pressure or force signal from the venous pressure or force sensor via the at least one dialysis fluid side force or pressure reference sensor arranged on the dialysis fluid outlet tube.

4. The method according to claim 2, further comprising:
   stopping a pump which delivers extracorporeal fluid through the extracorporeal circuit tube;
   after waiting the predetermined period of time, closing a venous tube clamp which is a tube clamp in a venous section of the extracorporeal circuit tube; and
   calibrating the pressure or force signal from the venous pressure or force sensor via the at least one dialysis fluid side force or pressure reference sensor.

5. The method according to claim 1, further comprising, as part of calibrating the pressure or force signal from the at least one pressure or force sensor with the received dialysis tube internal pressure in the dialysis fluid circuit:
   carrying out a dialyzer specific referencing in order to take into account an influence of the dialyzer; and/or
   taking into account a pulsation of pump roller rotors of a fluid conveying pump; and/or
   taking into account influencing variables, which cause an offset deviation of pressure curves.

* * * * *